(12) United States Patent
Wang et al.

(10) Patent No.: US 12,388,686 B2
(45) Date of Patent: Aug. 12, 2025

(54) SIGNAL DECISION EQUALIZATION METHOD AND APPARATUS

(71) Applicant: HUAWEI TECHNOLOGIES CO., LTD., Shenzhen (CN)

(72) Inventors: Weiyu Wang, Beijing (CN); Huanlu Li, Shenzhen (CN); Zhilei Huang, Shenzhen (CN); Yuchun Lu, Beijing (CN); Haiyang Zhang, Beijing (CN); Qinyu Zhou, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/397,782

(22) Filed: Dec. 27, 2023

(65) Prior Publication Data

US 2024/0129168 A1  Apr. 18, 2024

Related U.S. Application Data

(63) Continuation of application No. PCT/CN2022/090347, filed on Apr. 29, 2022.

(30) Foreign Application Priority Data

Jun. 30, 2021 (CN) .......................... 202110745652.8

(51) Int. Cl.
*H04L 25/03* (2006.01)
*H04L 25/49* (2006.01)

(52) U.S. Cl.
CPC .... *H04L 25/03057* (2013.01); *H04L 25/4917* (2013.01)

(58) Field of Classification Search
CPC ......... H04L 25/03006; H04L 25/03019; H04L 25/03057; H04L 25/03108; H04L 25/03267; H04L 25/4917; H04L 2025/03636
USPC ........ 375/232, 233, 346, 348, 350; 708/322, 708/323
See application file for complete search history.

(56) References Cited

U.S. PATENT DOCUMENTS 10,103,743 B1 * 10/2018 Wang ................... H03M 1/007
11,423,303 B1 *  8/2022 Jiao ........................ H03G 5/165
2009/0052516 A1 *  2/2009 Chen ................... H04L 25/0232
                                                                375/232

(Continued)

*Primary Examiner* — Young T. Tse
(74) *Attorney, Agent, or Firm* — Leydig, Voit & Mayer, Ltd.

(57) ABSTRACT

A signal decision equalization method and apparatus are provided. The method includes: obtaining an input signal; determining a decision circuit of the input signal; obtaining a first group of decision thresholds and a first group of equalization expectations of the decision circuit; determining a decision value of the input signal based on the first group of equalization expectations, the first group of decision thresholds, and the input signal, and outputting the decision value; updating, based on the decision value and the input signal, a first equalization expectation that is in the first group of equalization expectations and that corresponds to the decision value to a second equalization expectation to obtain a second group of equalization expectations; and updating at least one decision threshold in the first group of decision thresholds based on the second equalization expectation to obtain a second group of decision thresholds.

30 Claims, 16 Drawing Sheets

(56) References Cited

U.S. PATENT DOCUMENTS

| | | | |
|---|---|---|---|
| 2013/0094561 A1* | 4/2013 | Raphaeli | H04L 25/03057 375/233 |
| 2014/0328380 A1* | 11/2014 | Pustovalov | H04L 25/03885 375/232 |
| 2016/0028562 A1 | 1/2016 | Dallaire et al. | |
| 2016/0218889 A1* | 7/2016 | Zheng | H04L 25/03261 |
| 2019/0356393 A1 | 11/2019 | Azenkot | |

* cited by examiner

SIGNAL DECISION EQUALIZATION METHOD AND APPARATUS

CROSS-REFERENCE TO RELATED APPLICATIONS

This application is a continuation of International Application No. PCT/CN2022/090347, filed on Apr. 29, 2022, which claims priority to Chinese Patent Application No. 202110745652.8, filed on Jun. 30, 2021. The disclosures of the aforementioned applications are hereby incorporated by reference in their entireties.

TECHNICAL FIELD

This application relates to the communication field, and in particular, to a signal decision equalization method and apparatus.

BACKGROUND

With the continuous increase of network user requirements and data traffic, high-speed link technologies become basic technologies for chips and interfaces, including electrical interconnection links and optical interconnection links. Since the 50 Gbps transmission system, signal transmission of optical and electrical links have gradually transited from non-return-to-zero (NRZ) coding to pulse amplitude modulation (PAM). The multi-level modulation mode makes non-linear features of various optical and electrical components and channels appear. A main cause is interaction between chirp at a transmit end and fiber dispersion in an optical link, and a non-linear effect that is caused by high and low level charge and discharge at a transmit end, a continuous time linear equalizer (CTLE) at a receive end, and the like in an electrical link.

The non-linear features of the links introduce intersymbol interference, and causes signal distortion, which greatly affects a transmission feature of the system and hinders further improvement of a data transmission rate of the system.

Conventional linear adaptive filters are limited by a linear feature in a capability to approximate nonlinear functions. This causes satisfactory filter performance, and the linear adaptive filters cannot cope with this feature well. In recent years, the nonlinear filtering theory has become a research hotspot in the industry. For the current 100 Gbps transmission system and a future higher-speed transmission system, nonlinear equalization will become a key technical capability.

SUMMARY

Embodiments of this application provide a signal decision equalization method and apparatus, to implement optimal equalization and decision on a signal, to improve equalization performance and reduce a bit error rate after equalization.

According to a first aspect, an embodiment of this application provides a signal decision equalization method, specifically including: The decision equalization apparatus obtains an input signal, where the input signal is a pulse amplitude modulation (PAM) signal or a pre-equalized signal that is output after pre-equalization is performed on the PAM signal (for example, a pre-equalized signal that is output after pre-equalization is performed on the PAM signal by a feed forward equalizer (FFE)). Then, the decision equalization apparatus determines a decision circuit of the input signal. In addition, the decision equalization apparatus further obtains a first group of decision thresholds and a first group of equalization expectation that correspond to the decision circuit. Then the decision equalization apparatus determines a decision value of the input signal based on the first group of equalization expectations, the first group of decision thresholds, and the input signal, and outputs the decision value. In addition, the decision equalization apparatus updates a first equalization expectation in the first group of equalization expectations to a second equalization expectation based on the decision value and the input signal to obtain a second group of equalization expectations, where the first equalization expectation is an equalization expectation corresponding to the decision value. Finally, the decision equalization apparatus updates at least one decision threshold in the first group of decision thresholds based on the second equalization expectation to obtain a second group of decision thresholds, where the second group of decision thresholds and the second group of equalization expectations are used for next decision equalization of the decision circuit.

It may be understood that, in the technical solution provided in this embodiment, only a determining equalization process of the determining circuit that finally outputs the decision value is selected for description, but whether another determining circuit performs determining equalization is not limited. In other words, in this solution, in a possible implementation solution, another determining circuit may also perform determining equalization, but an output equalized signal is not selected. In another possible implementation solution, another determining circuit does not perform determining equalization.

In the technical solution provided in this embodiment, the decision equalization apparatus performs independent iteration and update on each decision threshold of the decision circuit based on the input signal of the decision circuit, the decision value corresponding to the input signal, and the equalization expectation corresponding to the decision value. This can implement optimal equalization and decision for a signal more effectively, thereby improving equalization performance and reducing a bit error rate after equalization.

Optionally, the determining equalization apparatus may update the first equalization expectation in the first group of equalization expectations to the second equalization expectation based on the decision value and the input signal in the following several possible implementations:

In a possible implementation, the decision equalization apparatus updates and iterates the equalization expectation corresponding to the decision circuit each time after performing decision equalization to obtain the decision value. In an example solution, the solution specifically includes: The decision equalization apparatus determines a decision error of the decision circuit based on the first equalization expectation and the input signal; and then updates the first equalization expectation to the second equalization expectation based on the decision error. In this way, a convergence process of the equalization expectation and the decision threshold can be quickly implemented, thereby implementing linear and non-linear equalization of a signal.

Optionally, in this embodiment, the decision error is equal to the first equalization expectation minus the input signal.

Optionally, a method in which the determining equalization apparatus updates the first equalization expectation to the second equalization expectation based on the decision error specifically includes:

In a possible implementation, the decision equalization apparatus updates the first equalization expectation to the second equalization expectation based on the decision error and a first formula, where the first formula is:

$$EV_{new}=EV_{old}\text{-sign}(e_k),$$

where $EV_{new}$ indicates the second equalization expectation, $EV_{old}$ indicates the first equalization expectation, $e_k$ indicates the decision error, and k indicates a current moment.

In another possible implementation, the decision equalization apparatus updates the first equalization expectation to the second equalization expectation based on the decision error and a second formula, where the second formula is:

$$EV_{new}=EV_{old}-\mu^*(e_k).$$

where $EV_{new}$ indicates the second equalization expectation, $EV_{old}$ indicates the first equalization expectation, $e_k$ indicates the decision error, µ indicates a preset constant, and k indicates a current moment.

In another possible implementation, the determining equalization apparatus updates and iterates an equalization expectation after a preset quantity of times of determining equalization is performed on an equalization expectation on the determining circuit (that is, after a quantity of times of determining an equalization expectation on the determining circuit reaches a preset quantity of times, for example, after a decision value corresponding to a decision value $EV_{33}$ is output for four times, the equalization expectation $EV_{33}$ is updated to $EV_{33, new}$). In an example solution, the solution specifically includes: The decision equalization apparatus obtains a decision error based on the input signal and the first equalization expectation. The decision equalization apparatus records the decision error to generate a decision error set, where the decision error set includes a decision error corresponding to the first equalization expectation. When a quantity of decision errors in the decision error set reaches a preset quantity, the decision equalization apparatus determines a final decision error based on the decision errors in the decision error set; and updates the first equalization expectation to the second equalization expectation based on the final decision error. In this way, a convergence process of the equalization expectation and the decision threshold can be quickly implemented, thereby implementing linear and non-linear equalization of a signal.

It may be understood that in this embodiment, when recording the decision error, the decision equalization apparatus may directly perform symbol calculation on the decision error, and then record values obtained through calculation as a decision error set. Finally, after a quantity of values corresponding to the decision error in the decision error set reaches a preset quantity, the final decision error is determined based on a value in the decision error set, and the first equalization expectation is updated to the second equalization expectation based on the final decision error. In an example solution, decision errors corresponding to the first equalization expectation are (−2, +4, +1, −5), and a decision error set obtained by performing symbol calculation on the decision error is recorded as (−1, +1, +1, −1). In this case, a final decision error is 0, and the first equalization expectation does not need to be updated in this update. If decision errors corresponding to the first equalization expectation are respectively (−2, +4, +1, +1), a decision error set obtained by performing symbol calculation on the decision errors is recorded as (−1, +1, +1, +1), a final decision error is 2, and the first equalization expectation is updated to the second equalization expectation based on the final decision error. In this way, operation complexity of the decision equalization apparatus in recording a decision error can be reduced.

Optionally, in this embodiment, the final decision error is equal to a sum of a plurality of decision errors.

Optionally, in this embodiment, that the decision equalization apparatus updates the first equalization expectation to the second equalization expectation based on the final decision error specifically includes:

In a possible implementation, the decision equalization apparatus updates the first equalization expectation to the second equalization expectation based on the final decision error and a first formula, where the first formula is:

$$EV_{new}=EV_{old}\text{-sign}(e_k),$$

where $EV_{new}$ indicates the second equalization expectation, $EV_{old}$ indicates the first equalization expectation, $e_k$ indicates the decision error, and k indicates a current moment.

In another possible implementation, the decision equalization apparatus updates the first equalization expectation to the second equalization expectation based on the decision error and a second formula, where the second formula is:

$$EV_{new}=EV_{old}-\mu^*(e_k),$$

where $EV_{new}$ indicates the second equalization expectation, $EV_{old}$ indicates the first equalization expectation, $e_k$ indicates the decision error, µ indicates a preset constant, and k indicates a current moment.

In another possible implementation, the decision equalization apparatus updates and iterates, after a preset time period, an equalization expectation corresponding to the decision circuit. In a possible implementation, the determining equalization apparatus collects statistics on an input signal corresponding to each equalization expectation on each decision circuit in a preset time period, and then obtains, based on the input signal corresponding to each equalization expectation, a decision error corresponding to each equalization expectation. Finally, the determining equalization apparatus updates each equalization expectation based on the decision error corresponding to each equalization expectation. It may be understood that a manner of updating the equalization expectation may be the same as the technical solutions described in the foregoing two solutions. Details are not described herein again. In this way, a convergence process of the equalization expectation and the decision threshold can be quickly implemented, thereby implementing linear and non-linear equalization of a signal.

Optionally, after the determining equalization apparatus updates the first equalization expectation to the second equalization expectation, the determining equalization apparatus updates the at least one decision threshold in the first group of decision thresholds based on the second equalization expectation and a third equalization expectation to obtain the second group of decision thresholds, where the third equalization expectation is an equalization expectation that is in the second group of equalization expectations and that is adjacent to the second equalization expectation.

Optionally, the decision equalization apparatus may further receive an initial convergence parameter output in a decision feedback equalizer (DFE) system, where the initial convergence parameter is used as an initial equalization expectation of the input signal when the decision equalization apparatus provided in this embodiment performs decision equalization. In this way, reliability of the equalization expectation and a decision threshold during initial decision equalization can be ensured, and a convergence process of the equalization expectation and the decision threshold can be accelerated.

Optionally, the decision equalization apparatus may further receive an adaptive parameter output by the FFE, where the adaptive parameter is used as an initial equalization expectation of the input signal when the decision equalization apparatus provided in this embodiment performs decision equalization. In this way, reliability of the equalization expectation and a decision threshold during initial decision equalization can be ensured, and a convergence process of the equalization expectation and the decision threshold can be accelerated.

Optionally, this embodiment is applied to a PAM signal. When performing signal decision equalization, the decision equalization apparatus needs to determine a quantity of decision circuits of the decision equalization apparatus and a quantity of decision thresholds of the decision equalization apparatus based on a quantity N of levels of the PAM signal and a quantity M of equalized signals in the decision value set, where both N and M are positive integers.

Optionally, the decision equalization apparatus determines the quantity of decision circuits and the quantity of decision thresholds based on the quantity N of levels of the PAM signal and the quantity M of equalized signals in the decision value set by using a third formula, where the third formula is:

$$S=N^M$$

$$P=N^{M}*(N-1),$$

where S indicates the quantity of decision circuits, P indicates the quantity of decision thresholds, N indicates the quantity of levels of the PAM signal, and M indicates the quantity of equalized signals in the decision value set.

Optionally, that the decision equalization apparatus determines a decision value of the input signal based on the first group of equalization expectations, the first group of decision thresholds, and the input signal includes:

The decision equalization apparatus determines the decision value of the input signal based on the first group of decision thresholds, the first group of equalization expectations, and the input signal through maximum likelihood sequence estimation.

Optionally, the determining equalization apparatus may use the following technical solution when determining the determining circuit of the input signal: The determining equalization apparatus determines the decision circuit of the input signal based on a decision value set, where the decision value set includes at least one decision value, and an occurrence moment of the at least one decision value is earlier than the occurrence moment of the input signal. In this embodiment, a quantity of decision values in the decision value set may be determined based on an architecture of the decision equalization apparatus. For example, if the decision equalization apparatus is a one-tap architecture, the decision value set includes a decision value output at a first moment. If the decision equalization apparatus is a dual-tap architecture, the decision value set includes a decision value output at a second moment. The second moment is earlier than the first moment, and the first moment is earlier than the occurrence moment of the current input signal.

According to a second aspect, this application provides a signal decision equalization method, specifically including: The decision equalization apparatus obtains an input signal, where the input signal is a PAM signal or a pre-equalized signal that is output after pre-equalization is performed on the PAM signal (for example, a pre-equalized signal that is output after pre-equalization is performed on the PAM signal by a feed forward equalizer (FFE)). Then, the decision equalization apparatus determines a decision circuit of the input signal. In addition, the decision equalization apparatus further obtains a first group of decision thresholds and a first equalization expectation that correspond to the decision circuit. Then the decision equalization apparatus determines a decision value of the input signal based on the first group of equalization expectations, the first group of decision thresholds, and the input signal, and outputs the decision value. In addition, the decision equalization apparatus updates all first equalization expectations in the first group of equalization expectations based on the decision value and the input signal to obtain a second group of equalization expectations. Finally, the decision equalization apparatus updates all of the first group of decision thresholds based on the second equalization expectation to obtain a second group of decision thresholds, where the second group of decision thresholds and the second group of equalization expectations are used for next decision equalization of the decision circuit.

In this embodiment, a process of updating all decision thresholds in the decision circuit may be implemented by using a method in the conventional technology, and details are not described herein again.

In the technical solution provided in this embodiment, the decision equalization apparatus performs iteration and update on all decision thresholds of the decision circuit based on an equalized signal that is output by the decision circuit. That is, update and iteration of decision circuits are independent of each other, but a decision threshold in each decision circuit is iterated and updated associatively. In this way, independent iteration and update of each decision circuit is implemented, and optimal equalization and decision can be effectively implemented for a signal, thereby improving equalization performance and reducing a bit error rate after equalization.

Optionally, the determining equalization apparatus may update all equalization expectations in the first group of equalization expectations to obtain the second group of equalization expectations based on the decision value and the input signal in the following several possible implementations:

In a possible implementation, the decision equalization apparatus updates and iterates the equalization expectation corresponding to the decision circuit each time after performing decision equalization to obtain the decision value.

In another possible implementation, the determining equalization apparatus updates and iterates an equalization expectation after a preset quantity of times of determining equalization is performed on an equalization expectation on the determining circuit (that is, after a quantity of times of determining an equalization expectation on the determining circuit reaches a preset quantity of times, for example, after a decision value corresponding to a decision value $EV_{33}$ is output for four times, the equalization expectation $EV_{33}$ is updated to $EV_{33,\ new}$).

In another possible implementation, the decision equalization apparatus updates and iterates, after a preset time period, an equalization expectation corresponding to the decision circuit.

Optionally, after the determining equalization apparatus updates the first group of equalization expectations to the second group of equalization expectations, the determining equalization apparatus updates all decision thresholds in the first group of decision thresholds based on each equalization expectation in the second group of equalization expectations to obtain the second group of decision thresholds.

Optionally, the decision equalization apparatus may further receive an initial convergence parameter output by the DFE system, where the initial convergence parameter is used as an initial equalization expectation of the input signal when the decision equalization apparatus provided in this embodiment performs decision equalization. In this way, reliability of the equalization expectation and a decision threshold during initial decision equalization can be ensured, and a convergence process of the equalization expectation and the decision threshold can be accelerated.

Optionally, the decision equalization apparatus may further receive an adaptive parameter output by the FFE, where the adaptive parameter is used as an initial equalization expectation of the input signal when the decision equalization apparatus provided in this embodiment performs decision equalization. In this way, reliability of the equalization expectation and a decision threshold during initial decision equalization can be ensured, and a convergence process of the equalization expectation and the decision threshold can be accelerated.

Optionally, this embodiment is applied to a PAM signal. When performing signal decision equalization, the decision equalization apparatus needs to determine a quantity of decision circuits of the decision equalization apparatus and a quantity of decision thresholds of the decision equalization apparatus based on a quantity N of levels of the PAM signal and a quantity M of equalized signals in the decision value set, where both N and M are positive integers.

Optionally, the decision equalization apparatus determines the quantity of decision circuits and the quantity of decision thresholds based on the quantity N of levels of the PAM signal and the quantity M of equalized signals in the decision value set by using a third formula, where the third formula is:

$$S=N^M$$

$$P=N^M*(N-1)'$$

where S indicates the quantity of decision circuits, P indicates the quantity of decision thresholds, N indicates the quantity of levels of the PAM signal, and M indicates the quantity of equalized signals in the decision value set.

Optionally, that the decision equalization apparatus determines a decision value of the input signal based on the first group of equalization expectations, the first group of decision thresholds, and the input signal includes:

The decision equalization apparatus determines the decision value of the input signal based on the first group of decision thresholds, the first group of equalization expectations, and the input signal through maximum likelihood sequence estimation.

Optionally, the determining equalization apparatus may use the following technical solution when determining the determining circuit of the input signal: The determining equalization apparatus determines the decision circuit of the input signal based on a decision value set, where the decision value set includes at least one decision value, and an occurrence moment of the at least one decision value is earlier than the occurrence moment of the input signal. In this embodiment, a quantity of decision values in the decision value set may be determined based on an architecture of the decision equalization apparatus. For example, if the decision equalization apparatus is a one-tap architecture, the decision value set includes a decision value output at a first moment. If the decision equalization apparatus is a dual-tap architecture, the decision value set includes a decision value output at a second moment. The second moment is earlier than the first moment, and the first moment is earlier than the occurrence moment of the current input signal.

According to a third aspect, an embodiment of this application provides a signal decision equalization apparatus, specifically including: The decision equalization apparatus obtains an input signal, where the input signal is a pulse amplitude modulation (PAM) signal or a pre-equalized signal that is output after pre-equalization is performed on the PAM signal (for example, a pre-equalized signal that is output after pre-equalization is performed on the PAM signal by a feed forward equalizer (FFE)). Then, the decision equalization apparatus determines a decision circuit of the input signal. In addition, the decision equalization apparatus further obtains a first group of decision thresholds and a first equalization expectation that correspond to the decision circuit. Distribution of the first group of decision thresholds is asymmetric distribution, and distribution of the first group of equalization expectations is asymmetric distribution. Then the decision equalization apparatus determines a decision value of the input signal based on the first group of equalization expectations, the first group of decision thresholds, and the input signal.

In this embodiment, distribution of the decision threshold and the equalization expectation in the decision equalization apparatus is related to a non-linear feature of the signal, and presents asymmetric distribution, so that optimal equalization and decision can be implemented for the signal more effectively, thereby improving equalization performance and reducing a bit error rate after equalization.

Optionally, a quantity of decision thresholds in the first group of decision thresholds is equal to a quantity of levels of the PAM signal minus 1; and a quantity of equalization expectations in the first group of equalization expectations is equal to the quantity of levels of the PAM signal.

Optionally, the first group of equalization expectations is obtained by updating an equalization expectation at a previous moment based on an input signal at the previous moment and a decision value that is determined and output by using the input signal at the previous moment, the previous moment is earlier than an occurrence moment of the input signal, and the first group of decision thresholds is obtained by updating the first group of equalization expectations; or the first group of equalization expectations is obtained by updating equalization expectations at previous N moments based on input signals at the previous N moments and decision values that are determined and output by the input signals at the previous N moments, the previous N moments are earlier than an occurrence moment of the input signal, and the first group of decision thresholds is obtained by updating the first group of equalization expectations.

Optionally, the decision circuit is included in a decision circuit set, decision thresholds of all channels of decision circuits in the decision circuit set are different, and equalization expectations of all channels of decision circuits in the decision circuit set are different. That is, each decision circuit in the decision equalization apparatus may implement independent adjustment. In this way, optimal equalization and decision can be implemented for a non-linear signal, thereby improving equalization performance and reducing a bit error rate after equalization.

Optionally, the determining equalization apparatus may use the following technical solution when determining the determining circuit of the input signal: The determining equalization apparatus determines the decision circuit of the input signal based on a decision value set, where the decision value set includes at least one decision value, and an occurrence moment of the at least one decision value is earlier than the occurrence moment of the input signal. In this embodiment, a quantity of decision values in the decision value set may be determined based on an architecture of the decision equalization apparatus. For example, if the decision equalization apparatus is a one-tap architecture, the decision value set includes a decision value output at a first moment. If the decision equalization apparatus is a dual-tap architecture, the decision value set includes a decision value output at a second moment. The second moment is earlier than the first moment, and the first moment is earlier than the occurrence moment of the current input signal.

According to a fourth aspect, this application provides a decision equalization apparatus. The system has a function of implementing behavior of the decision equalization apparatus in the first aspect. The function may be implemented by hardware, or may be implemented by hardware executing corresponding software. The hardware or the software includes one or more modules corresponding to the function.

In a possible implementation, the decision equalization apparatus includes units or modules configured to perform steps in the first aspect. For example, the decision equalization apparatus includes: an obtaining module, configured to input a signal, where the input signal is a pulse amplitude modulation (PAM) signal or a pre-equalized signal that is output after pre-equalization is performed on the PAM signal;
 a processing module, configured to determine a decision circuit of the input signal, where
 the obtaining module is further configured to obtain a first group of decision thresholds and a first group of equalization expectations of the decision circuit;
 the processing module is further configured to determine a decision value of the input signal based on the first group of equalization expectations, the first group of decision thresholds, and the input signal; and
 an output module, configured to output the decision value, where the processing module is further configured to: update a first equalization expectation in the first group of equalization expectations to a second equalization expectation based on the decision value and the input signal to obtain a second group of equalization expectations, where the first equalization expectation is an equalization expectation corresponding to the decision value; and update at least one decision threshold in the first group of decision thresholds based on the second equalization expectation to obtain a second group of decision thresholds, where the second group of decision thresholds and the second group of equalization expectations are used for next decision equalization of the decision circuit.

Optionally, the apparatus further includes a storage module, configured to store program instructions and data that are necessary for the decision equalization apparatus.

In a possible implementation, the decision equalization apparatus includes a processor and a transceiver. The processor is configured to support the decision equalization apparatus in performing a corresponding function in the method provided in the first aspect. The transceiver is configured to: determine communication between the decision equalization apparatus and another apparatus, receive a PAM signal that is output by a signal input apparatus, and output an equalized signal of the PAM signal. Optionally, the apparatus may further include a memory. The memory is configured to be coupled to the processor, and the memory stores program instructions and data that are necessary for the decision equalization apparatus.

In a possible implementation, when the system is a chip in a decision equalization apparatus, the chip includes a processing module and a transceiver module. The transceiver module may be, for example, an input/output interface, a pin, or a circuit on the chip. The transceiver module is configured to obtain an input signal, where the input signal is a pulse amplitude modulation (PAM) signal or a pre-equalized signal that is output after pre-equalization is performed on the PAM signal, and transmit the input signal to the processing module. The processing module may be, for example, a processor, and the processor is configured to determine a decision circuit of the input signal. The transceiver module is further configured to: obtain a first group of decision thresholds and a first group of equalization expectations of the decision circuit, and transmit the first group of decision thresholds and the first group of equalization expectations to the processing module. The processing module is configured to determine a decision value of the input signal based on the first group of equalization expectations, the first group of decision thresholds, and the input signal. The transceiver module is further configured to: output the decision value, and transmit the decision value to another chip or module coupled to the chip. The processing module is further configured to: update a first equalization expectation in the first group of equalization expectations to a second equalization expectation based on the decision value and the input signal to obtain a second group of equalization expectations where the first equalization expectation is an equalization expectation corresponding to the decision value; and update at least one decision threshold in the first group of decision thresholds based on the second equalization expectation to obtain a second group of decision thresholds, where the second group of decision thresholds and the second group of equalization expectations are used for next decision equalization of the decision circuit. The processing module may execute computer-executable instructions stored in a storage unit, to support the decision equalization apparatus in performing the method provided in the first aspect. Optionally, the storage unit may be a storage unit in the chip, for example, a register or a cache. The storage unit may alternatively be a storage unit outside the chip, for example, a read-only memory (ROM), another type of static storage device that can store static information and instructions, or a random access memory (RAM).

In a possible implementation, the system includes a communication interface and a logic circuit. The communication interface is configured to input a signal, and the input signal is a pulse amplitude modulation (PAM) signal or a pre-equalized signal that is output after pre-equalization is performed on the PAM signal. The logic circuit is configured to determine a decision circuit of the input signal. The communication interface is further configured to: obtain a first group of decision thresholds and a first group of equalization expectations of the decision circuit. The logic circuit is configured to determine a decision value of the input signal based on the first group of equalization expectations, the first group of decision thresholds, and the input signal. The communication interface is further configured to output the decision value. The logic circuit is further configured to: update a first equalization expectation in the first group of equalization expectations to a second equalization expectation based on the decision value and the input signal to obtain a second group of equalization expectations where the first equalization expectation is an equalization expectation corresponding to the decision value; and update at least one decision threshold in the first group of decision thresholds based on the second equalization expectation to obtain a second group of decision thresholds, where the second group of decision thresholds and the second group of equalization expectations are used for next decision equalization of the decision circuit.

The processor mentioned in any one of the foregoing may be a general-purpose central processing unit (CPU), a microprocessor, an application-specific integrated circuit (ASIC), or one or more integrated circuits configured to control program execution of the data transmission methods in the foregoing aspects.

According to a fifth aspect, an embodiment of this application provides a decision equalization apparatus. The system has a function of implementing behavior of the decision equalization apparatus in the second aspect. The function may be implemented by hardware, or may be implemented by hardware executing corresponding software. The hardware or the software includes one or more modules corresponding to the function.

In a possible implementation, the decision equalization apparatus includes units or modules configured to perform steps in the second aspect. For example, the decision equalization apparatus includes: an obtaining module, configured to obtain an input signal, where the input signal is a pulse amplitude modulation (PAM) signal or a pre-equalized signal that is output after pre-equalization is performed on the PAM signal;
  a processing module, configured to determine a decision circuit of the input signal, where
  the obtaining module is further configured to obtain a first group of decision thresholds and a first group of equalization expectations of the decision circuit;
  the processing module is further configured to determine a decision value of the input signal based on the first group of equalization expectations, the first group of decision thresholds, and the input signal; and
  an output module, configured to output the decision value, where the processing module is further configured to: update all equalization expectations in the first group of equalization expectations based on the decision value and the input signal to obtain a second group of equalization expectations; and update all of the first group of decision thresholds based on the second equalization expectation to obtain a second group of decision thresholds, where the second group of decision thresholds and the second group of equalization expectations are used for next decision equalization of the decision circuit.

Optionally, the apparatus further includes a storage module, configured to store program instructions and data that are necessary for the decision equalization apparatus.

In a possible implementation, the decision equalization apparatus includes a processor and a transceiver. The processor is configured to support the decision equalization apparatus in performing a corresponding function in the method provided in the second aspect. The transceiver is configured to: determine communication between the decision equalization apparatus and another apparatus, receive a PAM signal that is output by a signal input apparatus, and output an equalized signal of the PAM signal. Optionally, the apparatus may further include a memory. The memory is configured to be coupled to the processor, and the memory stores program instructions and data that are necessary for the decision equalization apparatus.

In a possible implementation, when the system is a chip in a decision equalization apparatus, the chip includes a processing module and a transceiver module. The transceiver module may be, for example, an input/output interface, a pin, or a circuit on the chip. The transceiver module is configured to obtain an input signal, where the input signal is a pulse amplitude modulation (PAM) signal or a pre-equalized signal that is output after pre-equalization is performed on the PAM signal, and transmit the input signal to the processing module. The processing module may be, for example, a processor, and the processor is configured to determine a decision circuit of the input signal. The transceiver module is further configured to: obtain a first group of decision thresholds and a first group of equalization expectations of the decision circuit, and transmit the first group of decision thresholds and the first group of equalization expectations to the processing module. The processing module is configured to determine a decision value of the input signal based on the first group of equalization expectations, the first group of decision thresholds, and the input signal. The transceiver module is further configured to: output the decision value, and transmit the decision value to another chip or module coupled to the chip. The processing module is further configured to: update all equalization expectations in the first group of equalization expectations based on the decision value and the input signal to obtain a second group of equalization expectations; and update all of the first group of decision thresholds based on the second equalization expectation to obtain a second group of decision thresholds, where the second group of decision thresholds and the second group of equalization expectations are used for next decision equalization of the decision circuit. The processing module may execute computer-executable instructions stored in a storage unit, to support the decision equalization apparatus in performing the method provided in the second aspect. Optionally, the storage unit may be a storage unit in the chip, for example, a register or a cache. The storage unit may alternatively be a storage unit outside the chip, for example, a read-only memory (ROM), another type of static storage device that can store static information and instructions, or a random access memory (RAM).

In a possible implementation, the system includes a communication interface and a logic circuit. The communication interface is configured to obtain an input signal, and the input signal is a pulse amplitude modulation (PAM) signal or a pre-equalized signal that is output after pre-equalization is performed on the PAM signal. The logic circuit is configured to determine a decision circuit of the input signal. The communication interface is further configured to: obtain a first group of decision thresholds and a first group of equalization expectations of the decision circuit. The logic circuit is configured to determine a decision value of the input signal based on the first group of equalization expectations, the first group of decision thresholds, and the input signal. The communication interface is further configured to output the decision value. The logic circuit is further configured to: update all equalization expectations in the first group of equalization expectations based on the decision value and the input signal to obtain a second group of equalization expectations; and update all of the first group of decision thresholds based on the second equalization expectation to obtain a second group of decision thresholds, where the second group of decision thresholds and the second group of equalization expectations are used for next decision equalization of the decision circuit.

Any processor mentioned above may be a CPU, a microprocessor, an ASIC, or one or more integrated circuits configured to control program execution of the data transmission methods in the foregoing aspects.

According to a sixth aspect, an embodiment of this application provides a decision equalization apparatus. The apparatus has a function of implementing behavior of the decision equalization apparatus in the second aspect. The function may be implemented by hardware, or may be implemented by hardware executing corresponding software. The hardware or the software includes one or more modules corresponding to the function.

In a possible implementation, the decision equalization apparatus includes units or modules configured to perform steps in the third aspect. For example, the decision equalization apparatus includes: an obtaining module, configured to obtain an input signal, where the input signal is a PAM signal or a pre-equalized signal that is output after pre-equalization is performed on the PAM signal; a processing module, configured to determine a decision circuit of the input signal, where the obtaining module is further configured to obtain a first group of decision thresholds and a first group of equalization expectations of the decision circuit; where distribution of the first group of decision thresholds is asymmetric distribution, and distribution of the first group of equalization expectations is asymmetric distribution; and the processing module is further configured to determine a decision value of the input signal based on the first group of equalization expectations, the first group of decision thresholds, and the input signal.

Optionally, the apparatus further includes a storage module, configured to store program instructions and data that are necessary for the decision equalization apparatus.

In a possible implementation, the decision equalization apparatus includes a processor and a transceiver. The processor is configured to support the decision equalization apparatus in performing a corresponding function in the method provided in the third aspect. The transceiver is configured to: determine communication between the decision equalization apparatus and another apparatus, receive a PAM signal that is output by a signal input apparatus, and output a decision value of the PAM signal. Optionally, the apparatus may further include a memory. The memory is configured to be coupled to the processor, and the memory stores program instructions and data that are necessary for the decision equalization apparatus.

In a possible implementation, when the system is a chip in a decision equalization apparatus, the chip includes a processing module and a transceiver module. The transceiver module may be, for example, an input/output interface, a pin, or a circuit on the chip. The transceiver module is configured to: obtain an input signal, where the input signal is a PAM signal or a pre-equalized signal that is output after pre-equalization is performed on the PAM signal, and transmit the input signal to the processing module. The processing module may be, for example, a processor, and the processor is configured to determine a decision circuit of the input signal. The transceiver module is further configured to: obtain a first group of decision thresholds and a first group of equalization expectations of the decision circuit, and transmit the first group of decision thresholds and the first group of equalization expectations to the processing module. The processing module is configured to determine a decision value of the input signal based on the first group of equalization expectations, the first group of decision thresholds, and the input signal. The transceiver module is further configured to output the decision value. The processing module may execute computer-executable instructions stored in a storage unit, to support the decision equalization apparatus in performing the method provided in the second aspect. Optionally, the storage unit may be a storage unit inside the chip, for example, a register or a buffer, or the storage unit may be a storage unit located outside the chip, for example, a ROM or another type of static storage device that can store static information and instructions, or a RAM.

In a possible implementation, the system includes a communication interface and a logic circuit. The communication interface is configured to obtain an input signal, and the input signal is a PAM signal or a pre-equalized signal that is output after pre-equalization is performed on the PAM signal. The logic circuit is configured to determine a decision circuit of the input signal. The communication interface is further configured to: obtain a first group of decision thresholds and a first group of equalization expectations of the decision circuit. The logic circuit is configured to determine a decision value of the input signal based on the first group of equalization expectations, the first group of decision thresholds, and the input signal. The communication interface is further configured to output the decision value.

Any processor mentioned above may be a CPU, a microprocessor, an ASIC, or one or more integrated circuits configured to control program execution of the data transmission methods in the foregoing aspects.

According to a seventh aspect, an embodiment of this application provides a computer-readable storage medium, where the computer storage medium stores computer instructions, and the computer instructions are used to perform the method according to any possible implementation of any one of the foregoing aspects.

According to an eighth aspect, an embodiment of this application provides a computer program product including instructions. When the computer program product runs on a computer, the computer performs the method according to any one of the foregoing aspects.

According to a ninth aspect, this application provides a chip system. The chip system includes a processor, configured to support a decision equalization apparatus in implementing functions in the foregoing aspects, for example, generating or processing data and/or information in the foregoing methods. In a possible design, the chip system further includes a memory. The memory is configured to store program instructions and data that are necessary for the decision equalization apparatus, to implement functions in any one of the foregoing aspects. The chip system may include a chip, or may include a chip and another discrete component.

According to a tenth aspect, an embodiment of this application provides a communication system. The system includes the decision equalization apparatus according to the foregoing aspects.

DESCRIPTION OF EMBODIMENTS

Figure 1:
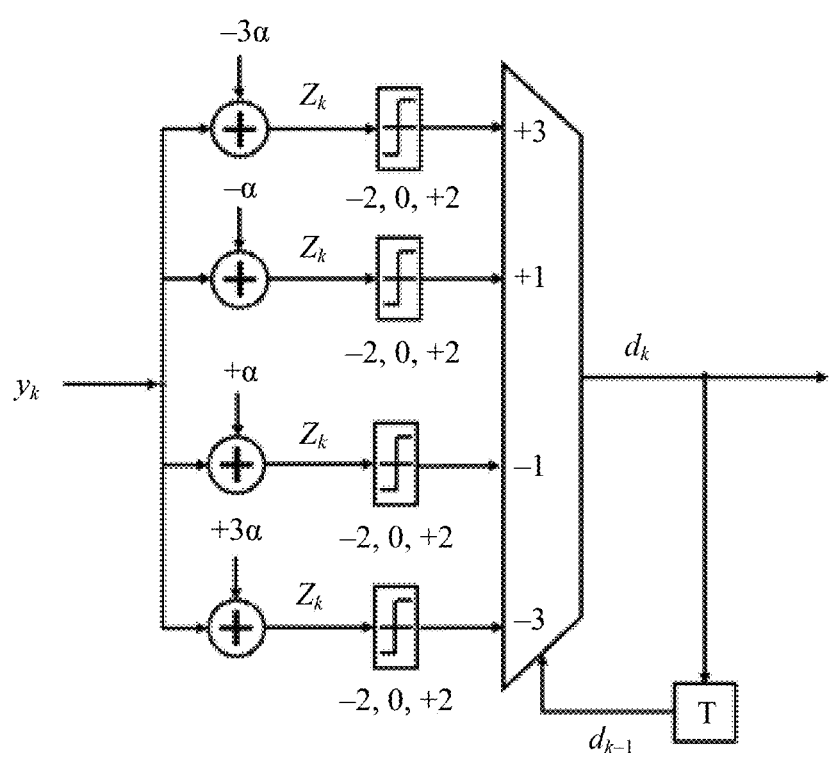
FIG. 1 is a schematic diagram of a one-tap DFE architecture.

To make objectives, technical solutions, and advantages of this application clearer, the following describes embodiments of this application with reference to the accompanying drawings. It is clear that the described embodiments are merely some but not all of embodiments of this application. A person of ordinary skill in the art may learn that, as a new application scenario emerges, the technical solutions provided in embodiments of this application are also applicable to a similar technical problem.

In the specification, claims, and accompanying drawings of this application, the terms "first", "second", and so on are intended to distinguish between similar objects but do not necessarily indicate a specific order or sequence. It should be understood that the data termed in such a way are interchangeable in proper circumstances so that embodiments of the present application described herein can be implemented in other orders than the order illustrated or described herein. In addition, the terms "include", "contain" and any other variants mean to cover the non-exclusive inclusion, for example, a process, method, system, product, or device that includes a list of steps or modules is not necessarily limited to those steps or modules, but may include other steps or modules not expressly listed or inherent to such a process, method, system, product, or device. Names or numbers of steps in this application do not mean that the steps in the method procedure need to be performed in a time/logical sequence indicated by the names or numbers. An execution sequence of the steps in the procedure that have been named or numbered can be changed based on a technical objective to be achieved, provided that same or similar technical effects can be achieved. Unit division in this application is logical division and may be other division during actual implementation. For example, a plurality of units may be combined or integrated into another system, or some features may be ignored or not performed. In addition, the displayed or discussed mutual couplings or direct couplings or communication connections may be implemented through some interfaces. The indirect couplings or communication connections between the units may be implemented in electronic or other similar forms. This is not limited in this application. In addition, units or subunits described as separate parts may or may not be physically separate, may or may not be physical units, or may be distributed into a plurality of circuit units. Some or all of the units may be selected according to actual requirements to achieve the objectives of the solutions of this application.

The following clearly describes the technical solutions in embodiments of this application with reference to the accompanying drawings in embodiments of this application. In descriptions of this application, "/" means "or" unless otherwise specified. For example, A/B may represent A or B. In this application, "and/or" describes only an association relationship for describing associated objects and represents that three relationships may exist. For example, A and/or B may represent the following three cases: Only A exists, both A and B exist, and only B exists. In addition, in the descriptions of this application, "at least one item" means one or more items, and "a plurality of items" means two or more items. "At least one item (piece) of the following" or a similar expression thereof means any combination of these items, including a singular item (piece) or any combination of plural items (pieces). For example, at least one item (piece) of a, b, or c may indicate a, b, c, a and b, a and c, b and c, or a, b, and c, where a, b, and c may be in a singular form or a plural form.

With the continuous increase of network user requirements and data traffic, high-speed link technologies become basic technologies for chips and interfaces, including electrical interconnection links and optical interconnection links. Since the 50 Gbps transmission system, signal transmission of optical and electrical links have gradually transited from NRZ coding to pulse amplitude modulation (PAM). The multi-level modulation mode makes non-linear features of various optical and electrical components and channels appear. A main cause is interaction between chirp at a transmit end and fiber dispersion in an optical link. A non-linear effect is caused by high and low level charge and discharge at a transmit end, a continuous time linear equalizer (CTLE) at a receive end, and the like in an electrical link. The non-linear features of the links introduce intersymbol interference, and causes signal distortion, which greatly affects a transmission feature of the system and hinders further improvement of a data transmission rate of the system. Conventional linear adaptive filters are limited by a linear feature in a capability to approximate nonlinear functions. This causes satisfactory filter performance, and the linear adaptive filters cannot cope with this feature well. In recent years, the nonlinear filtering theory has become a research hotspot in the industry. For the current 100 Gbps transmission system and a future higher-speed transmission system, nonlinear equalization will become a key technical capability.

Currently, a DFE is a common intersymbol interference equalizer. In an example solution, in a one-tap DFE architecture of a PAM-4 signal shown in FIG. 1, a received FFE output value $y_k$ is separately determined in four channels of decision circuits to obtain an equalized signal, and then a final decision value corresponding to $y_k$ is selected based on a decision value of a previous signal. In the DFE architecture shown in FIG. 1, decision thresholds of the four channels of decision circuits are the same. That is, a decision threshold of each channel is the same. In an example solution, for example, at a first moment, decision thresholds of each channel of decision circuit are (−2, 0, +2), as shown in FIG. 1, and after the decision threshold is updated at a second moment, decision thresholds of each channel of decision circuit are (−1.5, 0, +1.5). Because decision thresholds of all decision circuits are the same, signals of different levels are equalized in a same manner, and a non-linear feature of a channel cannot be equalized.

For ease of understanding, the following explains some terms in embodiments of this application.

PAM signal: is a signal generated through PAM modulation. The PAM modulation refers to a modulation mode in which an amplitude of a pulse carrier changes with a baseband signal.

Pre-equalized signal: In this embodiment, the pre-equalized signal is an equalized signal obtained by performing equalization processing on the PAM signal by using another equalizer before the PAM signal is input into a decision equalization apparatus provided in this embodiment of this application. For example, the PAM signal may be equalized by an FFE to obtain an equalized signal.

Decision threshold: is an intermediate value of adjacent level amplitudes. In this embodiment, a quantity of decision thresholds is related to a quantity of levels of a PAM signal. For example, four levels of a PAM-4 signal are respectively (+3, +1, −1, −3), a quantity of decision thresholds in a decider is 3, and decision thresholds are (+2, 0, −2).

Equalization expectation: indicates expected result values of signal equalization performed by an equalizer in the current configuration. For example, for a PAM-4 signal, values of the equalization expectation may be (+30, +10, −10, −30).

Decision value: A decider determines, based on a decision threshold, a decision result corresponding to a to-be-equalized signal. For example, an example value of the decision value may be (+3, +1, −1, −3).

To resolve this problem, embodiments of this application provide the following technical solution: The decision equalization apparatus obtains an input signal, where the input signal is a PAM signal or a pre-equalized signal that is output after pre-equalization is performed on the PAM signal. Then, the decision equalization apparatus determines a decision circuit of the input signal. In addition, the decision equalization apparatus further obtains a first group of decision thresholds and a first equalization expectation that correspond to the decision circuit. Then the decision equalization apparatus determines a decision value of the input signal based on the first group of equalization expectations, the first group of decision thresholds, and the input signal, and outputs the decision value. In addition, the decision equalization apparatus updates a first equalization expectation in the first group of equalization expectations to a second equalization expectation based on the decision value and the input signal to obtain a second group of equalization expectations, where the first equalization expectation is an equalization expectation corresponding to the decision value. Finally, the decision equalization apparatus updates at least one decision threshold in the first group of decision thresholds based on the second equalization expectation to obtain a second group of decision thresholds, where the second group of decision thresholds and the second group of equalization expectations are used for next decision equalization of the decision circuit.

Figure 2:
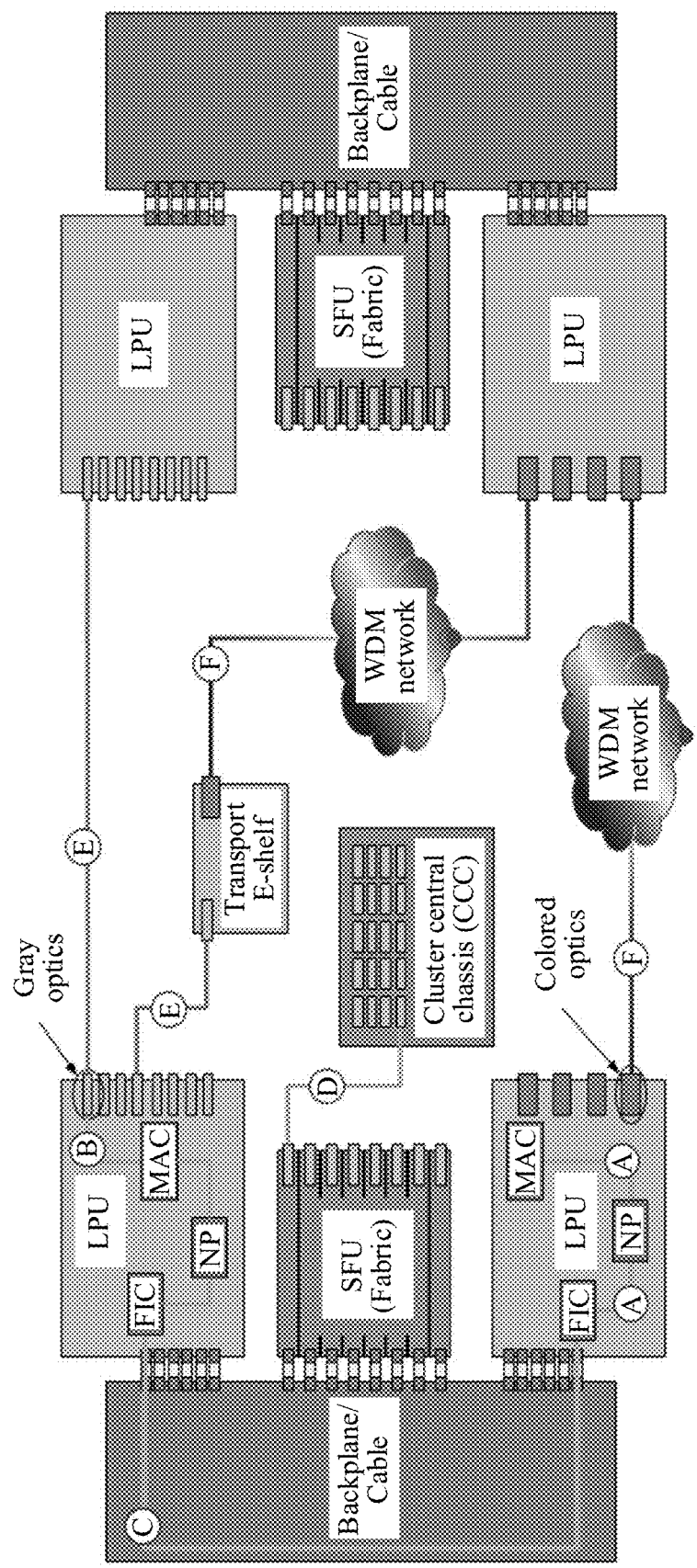
FIG. 2 is a schematic diagram of an application scenario according to an embodiment of this application.

Specifically, refer to FIG. 2. The technical solution provided in embodiments of this application may be applied to scenarios such as wired optical interconnection and optical-electrical interconnection, and specifically include but is not limited to:

(A) Chip to chip (for example, a fabric interface controller (FIC), a network chip (networking processor, NP), and media access control (MAC)) in an interface board (line processing unit, LPU);
(B) Chip to gray light module;
(C) Line card to backplane or cable;
(D) Switch fabric units (SFUs) to router cluster;
(E) Gray light optical interconnection; and
(F) Long-distance colored light optical interconnection.

Figure 3A:
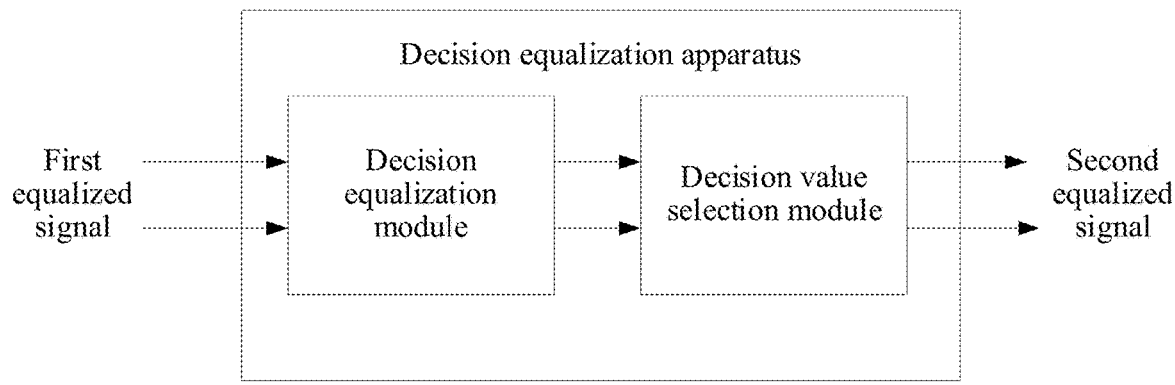
FIG. 3A is a schematic diagram of a functional module of a decision equalization apparatus according to an embodiment of this application.

In the foregoing application scenarios, in an example solution, a functional module architecture of the decision equalization apparatus may be shown in FIG. 3A. A PAM signal is first preliminarily equalized by using an FFE equalizer to obtain an equalized pre-equalized signal (used as an input signal of the decision equalization apparatus). Then, the decision equalization apparatus receives the pre-equalized signal that is output by the FFE, and outputs a final decision value by using a decision module and a decision value selection module. A specific procedure in which a signal passes through the decision module and the decision value selection module is as follows: All decision circuits in the decision module re-equalize the pre-equalized signal and output a decision value, and the decision value selection module is configured to determine a final decision value based on a decision value at a previous moment. The functional module architecture of the decision equalization apparatus may be implemented in a specific chip in a form of an IP core. Specifically, the chip may be a switch chip or an interface chip applied in a router, a switch, or an optical transport network (OTN) transmission device, or any chip that requires a high-speed communication interface.

Figure 3B:
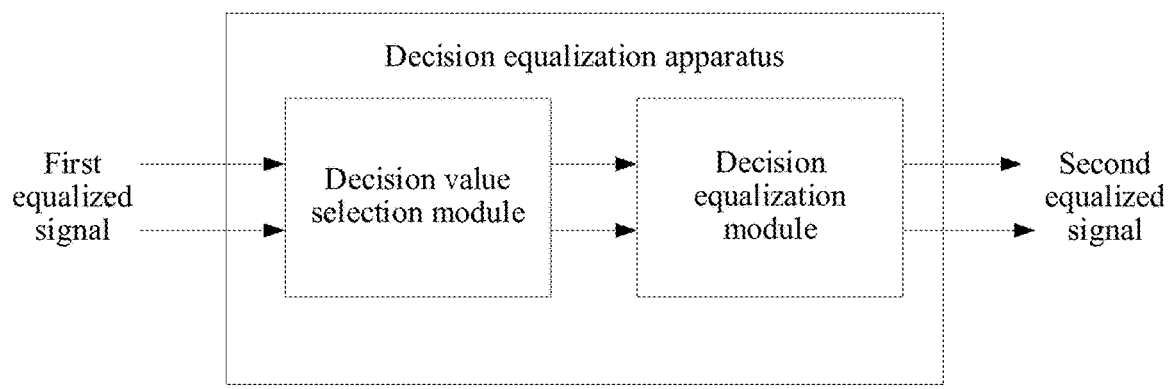
FIG. 3B is a schematic diagram of another functional module of a decision equalization apparatus according to an embodiment of this application.

It may be understood that, according to different implementation sequences of the solutions, a functional module architecture of the decision equalization apparatus may alternatively be shown in FIG. 3B. A PAM signal is first preliminarily equalized by using an FFE equalizer to obtain an equalized pre-equalized signal (used as an input signal of the decision equalization apparatus). Then, the decision equalization apparatus receives the pre-equalized signal that is output by the FFE, and outputs a final decision value by using a decision value selection module and a decision module. A specific procedure in which the signal passes through the decision value selection module and the decision module is as follows: The decision value selection module determines a decision circuit of the signal based on a decision value at a previous moment; and then the decision module selects the decision circuit to perform re-equalization on the pre-equalized signal to obtain a final decision value. The functional module architecture of the decision equalization apparatus may be implemented in a specific chip in a form of an IP core. Specifically, the chip may be a switch chip or an interface chip applied in a router, a switch, or an optical transport network (OTN) transmission device, or any chip that requires a high-speed communication interface.

Figure 3C:
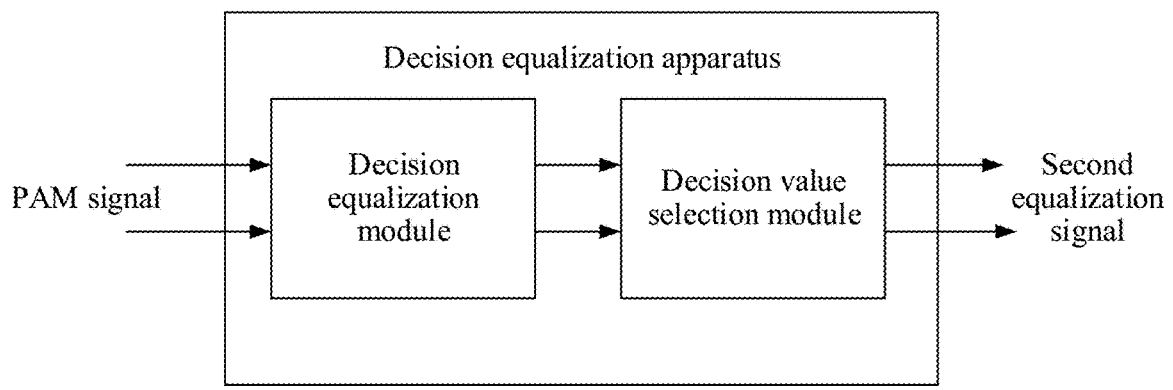
FIG. 3C is a schematic diagram of another functional module of a decision equalization apparatus according to an embodiment of this application.

In an example solution, a functional module architecture of the decision equalization apparatus may be shown in FIG. 3C. The decision equalization apparatus receives a PAM signal (the PAM signal is used as an input signal of the decision equalization apparatus), and outputs a final decision value by using a decision module and a decision value selection module. A specific procedure in which the PAM signal passes through the decision module and the decision value selection module is as follows: All decision circuits in the decision module perform equalization on the PAM signal and output a decision value, and the decision value selection module is configured to determine a final decision value based on a decision value at a previous moment, and output the final decision value. The functional module architecture of the decision equalization apparatus may be implemented in a specific chip in a form of an IP core. Specifically, the chip may be a switch chip or an interface chip applied in a router, a switch, or an optical transport network (OTN) transmission device, or any chip that requires a high-speed communication interface.

Figure 3D:
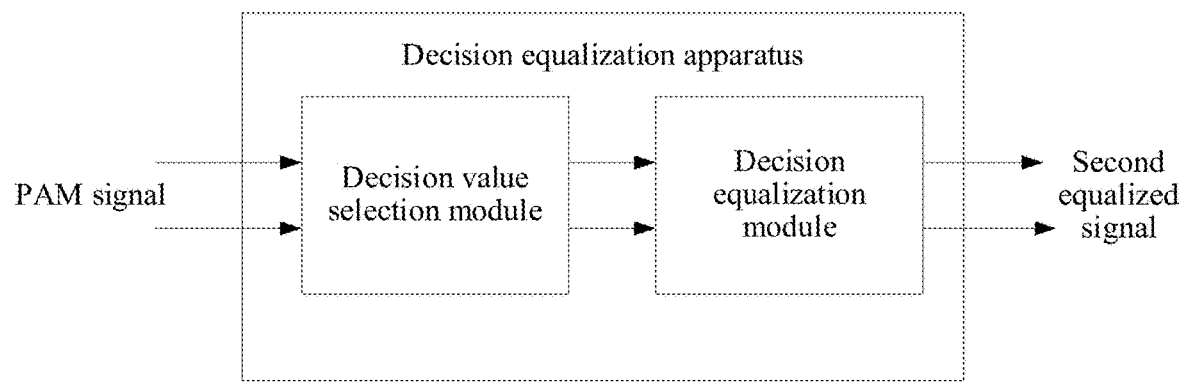
FIG. 3D is a schematic diagram of another functional module of a decision equalization apparatus according to an embodiment of this application.

It may be understood that, according to different implementation sequences of the solutions, a functional module architecture of the decision equalization apparatus may alternatively be shown in FIG. 3D. The decision equalization apparatus receives a PAM signal (the PAM signal is used as an input signal of the decision equalization apparatus), and outputs a final decision value by using a decision module and a decision value selection module. A specific procedure in which the PAM signal passes through the decision module and the decision value selection module is as follows: The decision value selection module determines a decision circuit of a PAM signal based on a decision value at a previous moment; and then the decision module selects the decision circuit to perform equalization the PAM signal to obtain a final decision value. The functional module architecture of the decision equalization apparatus may be implemented in a specific chip in a form of an IP core. Specifically, the chip may be a switch chip or an interface chip applied in a router, a switch, or an optical transport network (OTN) transmission device, or any chip that requires a high-speed communication interface.

Figure 4:
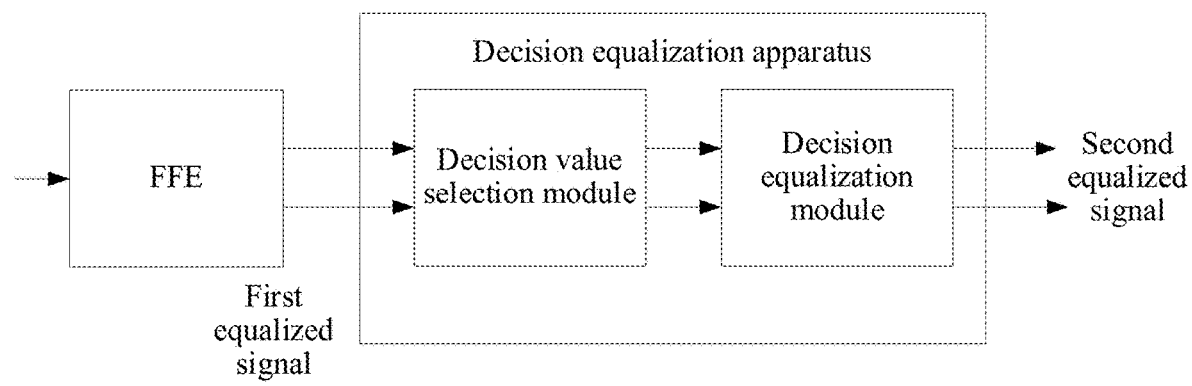
FIG. 4 is a schematic diagram of signal decision equalization combining a decision equalization apparatus and an FFE according to an embodiment of this application.

In an overall signal equalization process, an example solution of a functional module architecture mainly included in the equalization process may be shown in FIG. 4, and mainly includes an FFE and a decision equalization apparatus. The FFE performs preliminary equalization on a PAM signal to obtain an equalized pre-equalized signal, and then a decision module and a decision value selection module in the decision equalization apparatus perform decision equalization on the pre-equalized signal again and output a decision value.

Figure 5:
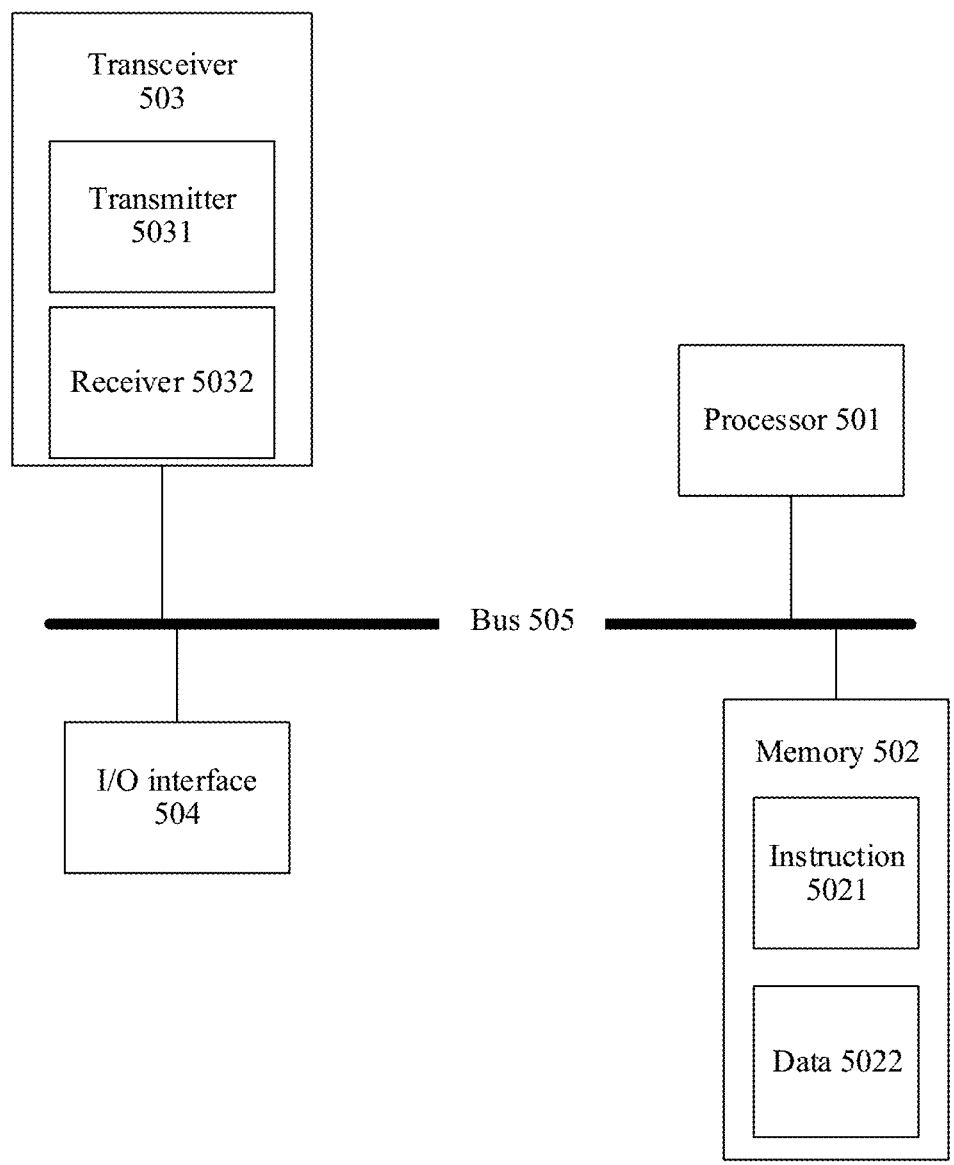
FIG. 5 is a schematic diagram of a structure of a decision equalization apparatus according to an embodiment of this application.

FIG. 5 is a schematic diagram of a hardware structure of a decision equalization apparatus according to an embodiment of this application. As shown in FIG. 5, the determining equalization apparatus includes at least a processor 501, a memory 502, and a transceiver 503. The memory 502 is further configured to store an instruction 5021 and data 5022. Optionally, the determining equalization apparatus may further include an I/O (input/output) interface 504 and a bus 505. The transceiver 503 further includes a transmitter 5031 and a receiver 5032. In addition, the processor 501, the transceiver 503, the memory 502, and the I/O interface 504 are communicatively connected to each other by using the bus 505.

The processor 501 may be a general purpose processor, for example, but is not limited to a central processing unit (CPU), or may be a dedicated processor, for example, but is not limited to a digital signal processor (DSP), an application-specific integrated circuit (ASIC), and a field programmable gate array (FPGA). Alternatively, the processor 501 may be a neural network processing unit (NPU). In addition, the processor 501 may be a combination of a plurality of processors. Particularly, in the technical solution provided in this embodiment of this application, the processor 501 may be configured to perform related steps of an Ethernet packet generation method in a subsequent method embodiment. The processor 501 may be a processor specially designed to perform the foregoing steps and/or operations, or may be a processor that performs the foregoing steps and/or operations by reading and executing the instruction 5021 stored in the memory 502. The processor 501 may need to use the data 5022 in a process of performing the foregoing steps and/or operations.

The transceiver 503 includes a transmitter 5031 and a receiver 5032. The transmitter 5031 and the receiver 5032 may perform an operation performed by a receiving module or a sending module in a decision equalization apparatus when a decision equalization method in a subsequent method embodiment is applied to the decision equalization apparatus.

In embodiments of this application, the transceiver 503 is configured to support the decision equalization apparatus in performing the foregoing receiving function and sending function. A processor having a processing function is considered as the processor 501. The receiver 5032 may also be referred to as an input port, a receiving circuit, or the like, and the transmitter 5031 may be referred to as a transmitter, a transmitting circuit, or the like.

The processor 501 may be configured to execute the instruction stored in the memory 502, to control the transceiver 503 to receive a message and/or send a message, to complete a function of the equalization determining apparatus in the method embodiment of this application. In an implementation, it may be considered that a function of the transceiver 503 is implemented by using a transceiver circuit or a dedicated transceiver chip. In this embodiment of this application, that the transceiver 503 receives a message may be understood as that a message is input to the transceiver 503, and that the transceiver 503 sends a message may be understood as that the transceiver 503 outputs a message.

The memory 502 may be various types of storage media, for example, a random access memory (RAM), a read-only memory (ROM), a non-volatile RAM (NVRAM), a programmable ROM (PROM), an erasable PROM (EPROM), an electrically erasable PROM (EEPROM), a flash memory, an optical memory, and a register. The memory 502 is specifically configured to store the instruction 5021 and the data 5022. The processor 501 may read and execute the instruction 5021 stored in the memory 502, to perform the steps and/or the operations in the method embodiments of this application. The data 5022 may be required in a process of performing the operations and/or the steps in the method embodiments of this application.

Optionally, the decision equalization apparatus may further include an I/O interface 504. The I/O interface 504 is configured to: receive an instruction and/or data from a peripheral device, and output the instruction and/or data to a peripheral device.

The technical solutions in embodiments of this application may be applied to various communication systems, for example, a global system of mobile communication (GSM) system, a code division multiple access (CDMA) system, a wideband code division multiple access (WCDMA) system, a long term evolution (LTE) system, an LTE frequency division duplex (FDD) system, an LTE time division duplex (TDD) system, a universal mobile telecommunications system (UMTS), a 5G communication system, and a future wireless communication system.

Figure 6:
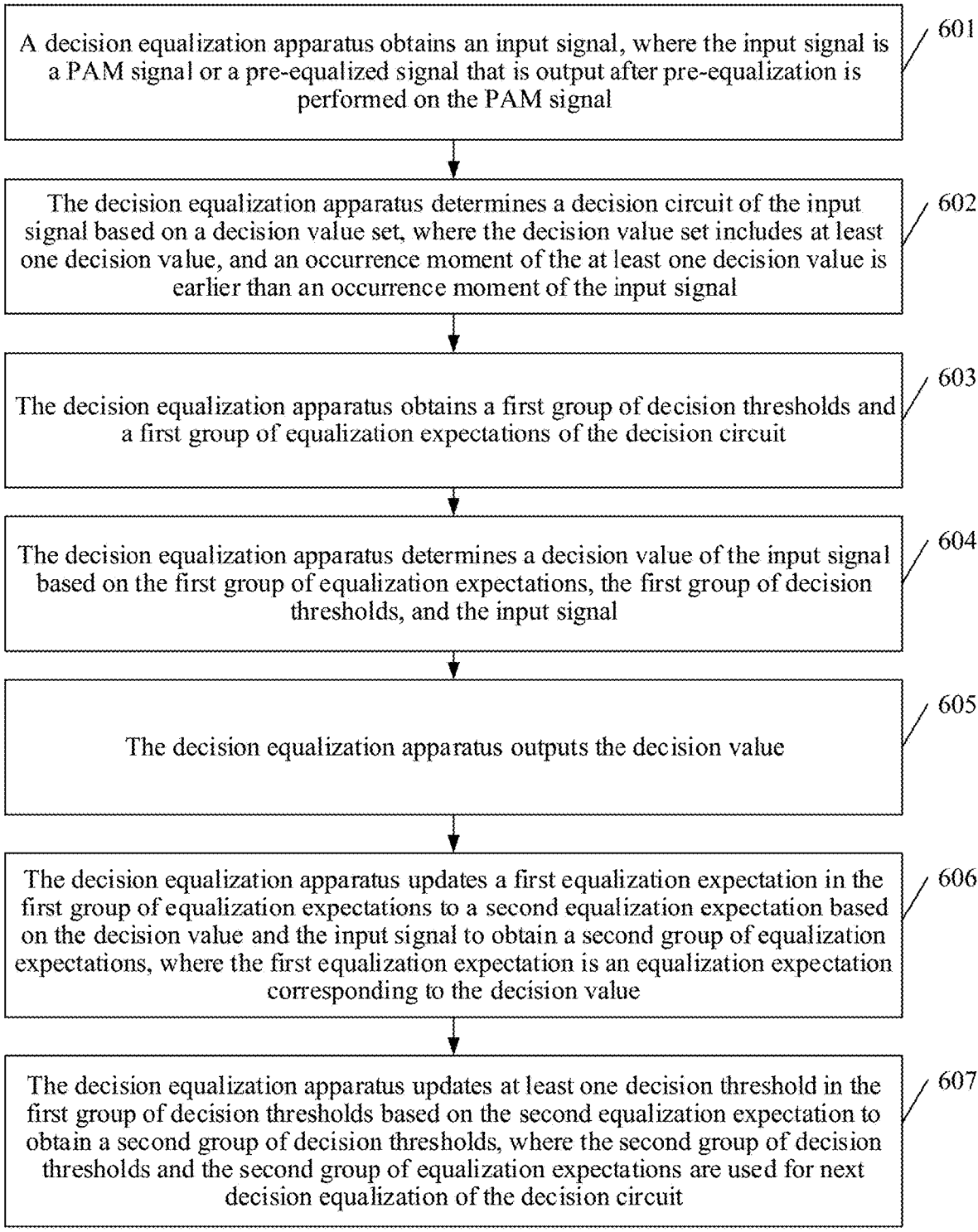
FIG. 6 is a schematic diagram of an embodiment of a decision equalization method of a nonlinear signal according to an embodiment of this application.

Specifically, refer to FIG. 6. An embodiment of a signal decision equalization method in an embodiment of this application includes the following steps.

601: A decision equalization apparatus obtains an input signal, where the input signal is a PAM signal or a pre-equalized signal that is output after pre-equalization is performed on the PAM signal.

The decision equalization apparatus receives the input signal. The input signal may be a PAM signal, or may be an equalized signal that is preliminarily equalized by an FFE. For example, if an equalized signal that is output by the FFE at a first moment is 30, an input signal received by the decision equalization apparatus is 30. Alternatively, at the first moment, the decision apparatus directly receives a PAM signal on which equalization is not performed.

602: The decision equalization apparatus determines a decision circuit of the input signal based on a decision value set, where the decision value set includes at least one decision value, and an occurrence moment of the at least one decision value is earlier than an occurrence moment of the input signal.

The decision equalization apparatus obtains a decision value set before the occurrence moment of the input signal, and then determines the decision circuit of the input signal based on a decision value corresponding to the decision value set.

Figure 7:
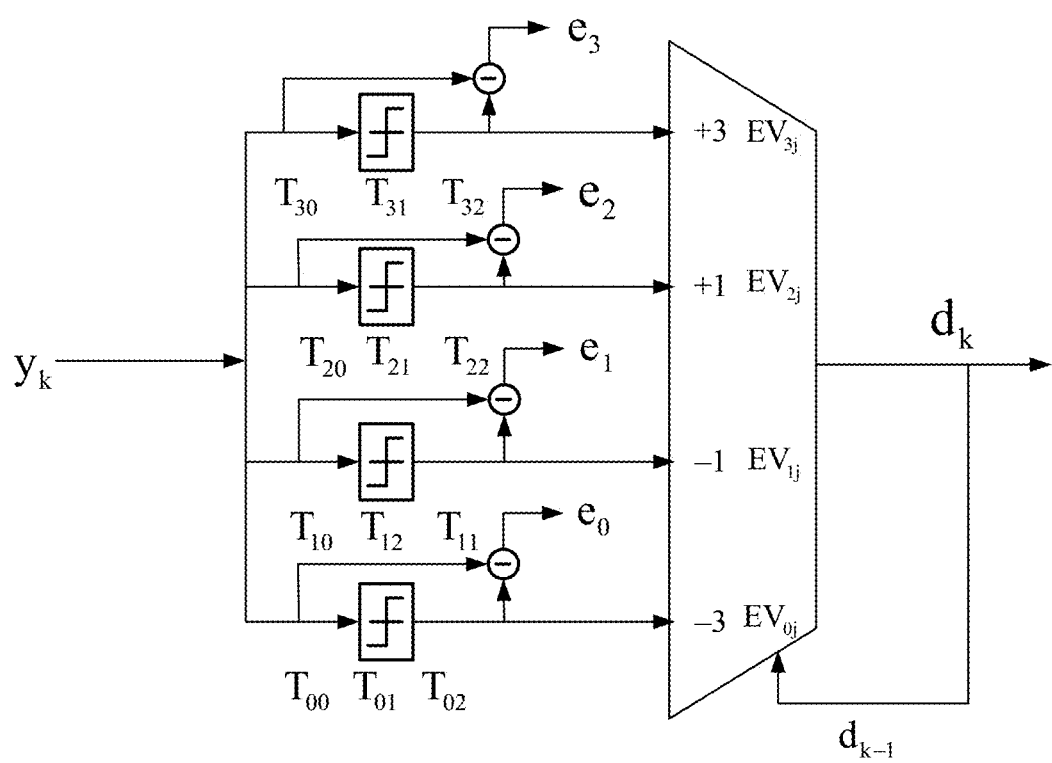
FIG. 7 is a schematic diagram of an architecture of decision equalization of a nonlinear signal according to an embodiment of this application.

In this embodiment, the decision circuit is a decision circuit for the decision equalization apparatus to finally select a decision value. However, whether another decision circuit performs decision equalization on the input signal is not limited herein. That is, a working mode of the decision equalization apparatus includes the following possible cases:

A possible implementation is shown in FIG. 7. After receiving the input signal, the decision equalization apparatus inputs the input signal to all decision circuits, and the decision circuits perform decision equalization and output a decision value. Then, the decision equalization apparatus selects, based on the input signal, the decision circuit of the final decision value.

Figure 8:
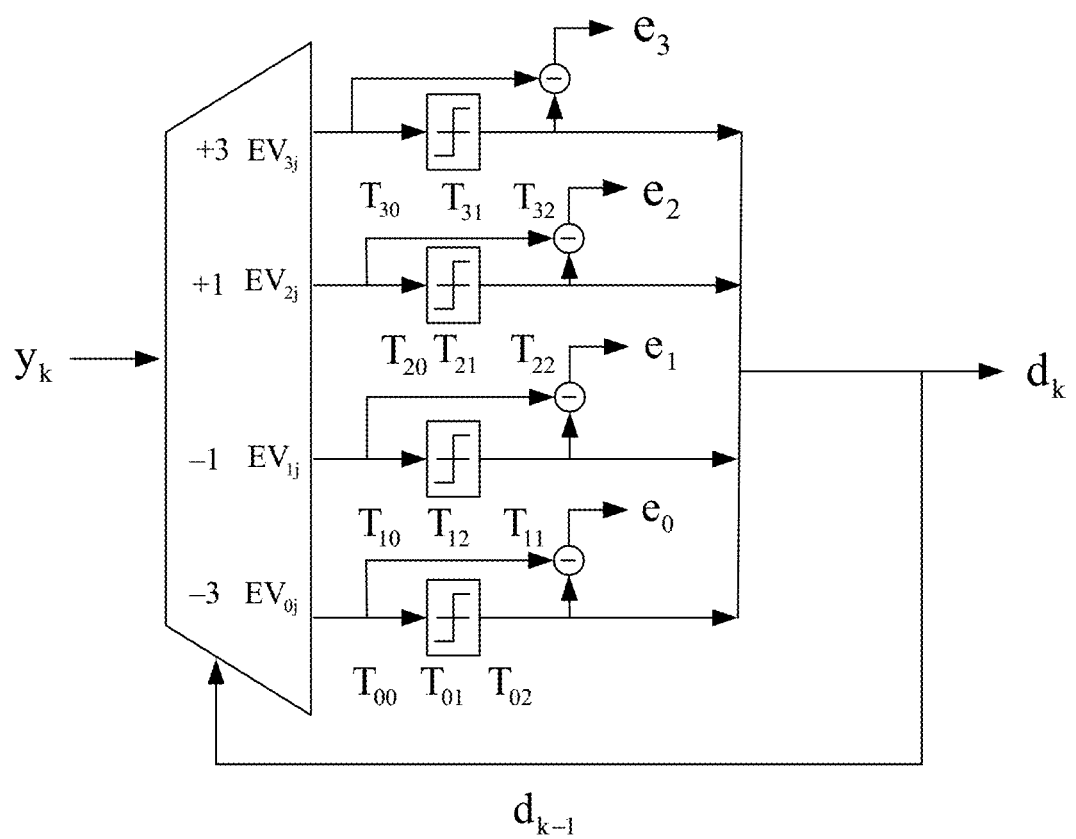
FIG. 8 is a schematic diagram of another architecture of decision equalization of a nonlinear signal according to an embodiment of this application.

Another possible implementation is shown in FIG. 8. After receiving the input signal, the decision equalization apparatus determines, based on the decision value set, a decision circuit for selecting the final decision value for the input signal, and then inputs the input signal to the decision circuit for decision equalization, and outputs a corresponding decision value.

It may be understood that the decision value set includes at least one equalized signal. In the one-tap PAM-4 signal shown in FIG. 7 and FIG. 8, the decision value set includes one equalized signal. As shown in FIG. 7 and FIG. 8, assuming that a current moment is $d_k$, an equalized signal in the decision value set is an equalized signal at a moment $d_{k-1}$.

Figure 9:
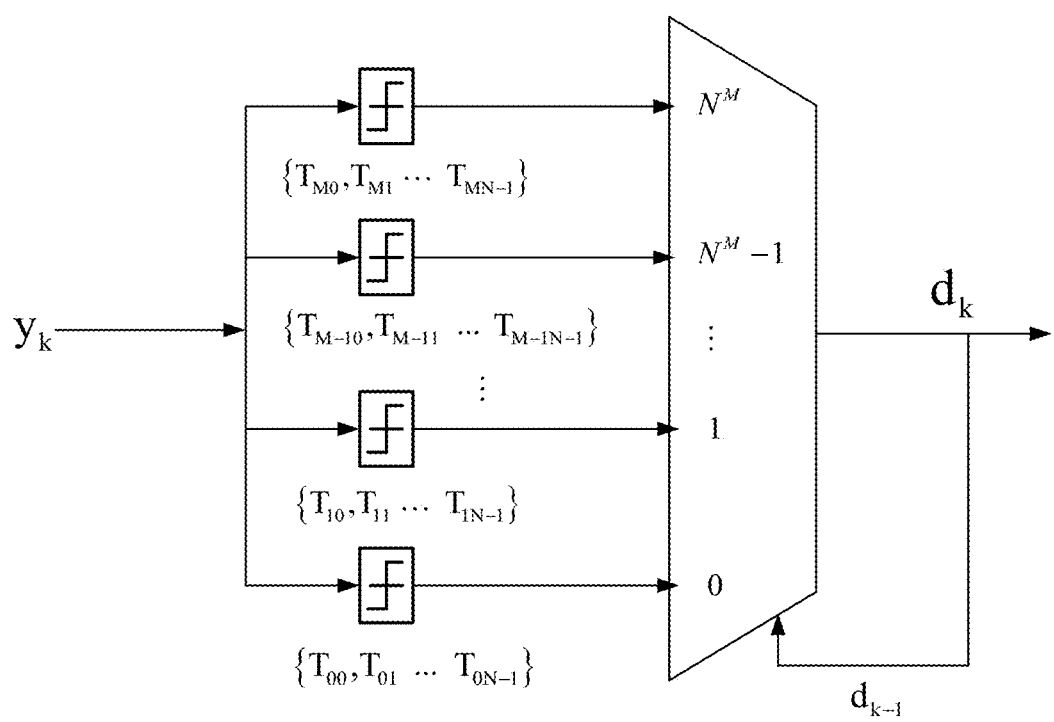
FIG. 9 is a schematic diagram of a decision circuit and a decision threshold according to an embodiment of this application.
Figure 10:
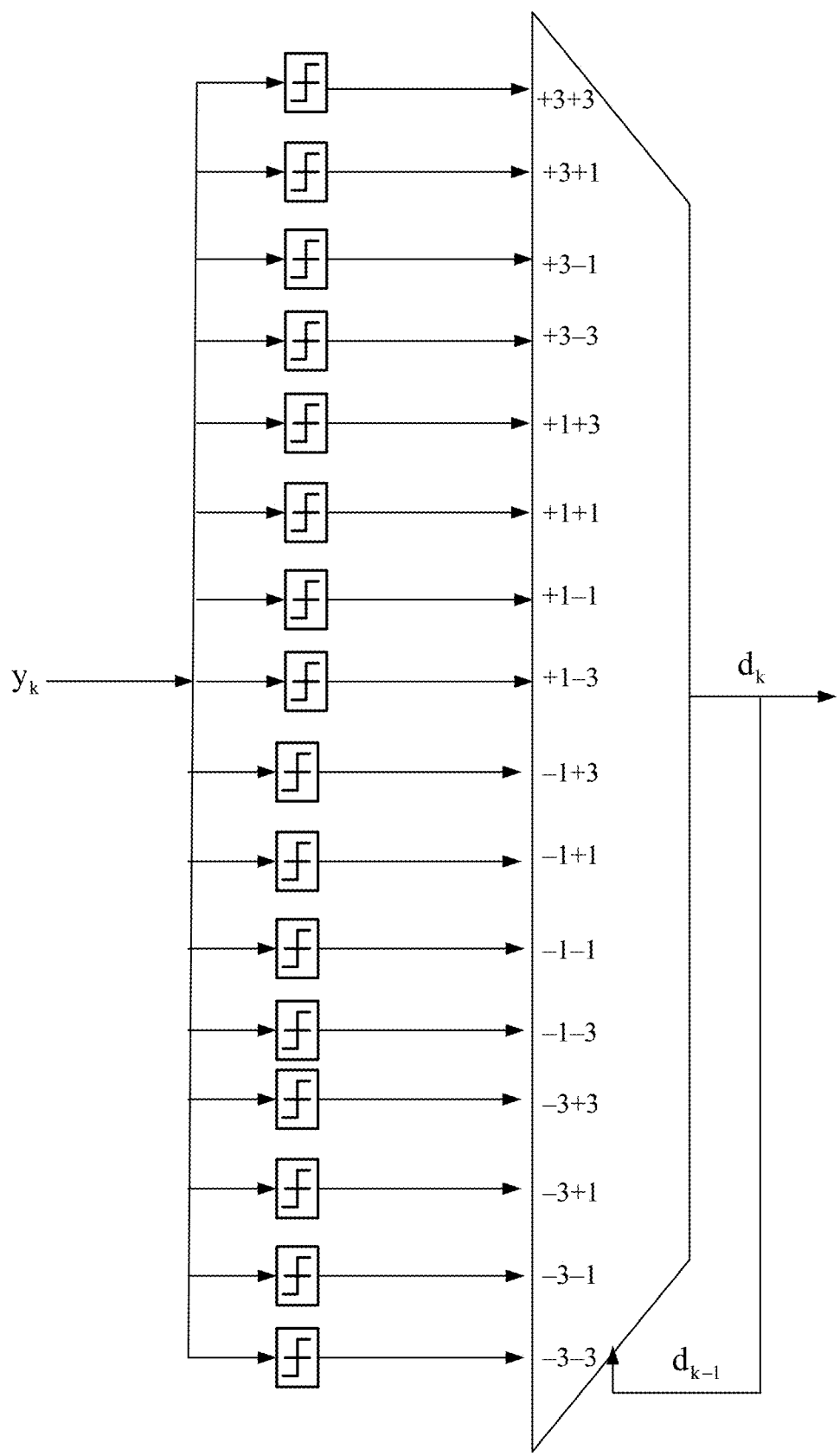
FIG. 10 is an example schematic diagram of a determining circuit and a determining threshold according to an embodiment of this application.

In this embodiment, 4 in the PAM-4 indicates a level quantity of the PAM signal, and the PAM signal may include level quantities in a plurality of cases, for example, the level quantity may be 8. That the quantity of levels and a quantity of equalized signals in the decision value set may affect a quantity of decision circuits and a quantity of decision thresholds in the decision equalization apparatus specifically includes: The decision equalization apparatus determines the quantity of decision circuits and the quantity of decision thresholds based on the quantity N of levels of the PAM signal and the quantity M of equalized signals in the decision value set by using a third formula, where the third formula is:

$$S=N^M$$

$$P=N^{M}*(N-1)'$$

where S indicates the quantity of decision circuits, P indicates the quantity of decision thresholds, N indicates the quantity of levels of the PAM signal, and M indicates the quantity of equalized signals in the decision value set (which may also be referred to as a quantity of taps in an equalization architecture, and a value of M is 1 in a case of one tap and M is 2 in a case of two taps). The decision equalization architecture may be shown in FIG. 9. In an example solution, when the quantity of levels is 4, and the decision value set includes an equalized signal (also referred to as a one-tap architecture), decision circuits in the decision equalization apparatus may be a four-channel decision circuit (+3, +1, −1, −3) shown in FIG. 7 and FIG. 8. Each channel of decision circuit includes three decision thresholds (2, 0, −2). The decision equalization apparatus has a total of 12 decision thresholds. If the quantity of levels is 4, the decision value set includes two equalized signals. The decision circuit in the decision equalization apparatus may be a 16-channel decision circuit (+3+3, +3+1, +3−1, +3−3, +1+3, +1+1, +1−1, +1−3, −1+3, −1+1, −1−1, −1−3, −3+3, −3+1, −3−1, −3−3) shown in FIG. 10. Each channel of decision circuit includes three decision thresholds (2, 0, −2), and the decision equalization apparatus has a total of 64 decision thresholds.

603: The decision equalization apparatus obtains a first group of decision thresholds and a first group of equalization expectations of the decision circuit.

The decision equalization apparatus obtains the first group of decision thresholds and the first group of equalization expectations that correspond to the decision circuit at a current moment.

Figure 11:
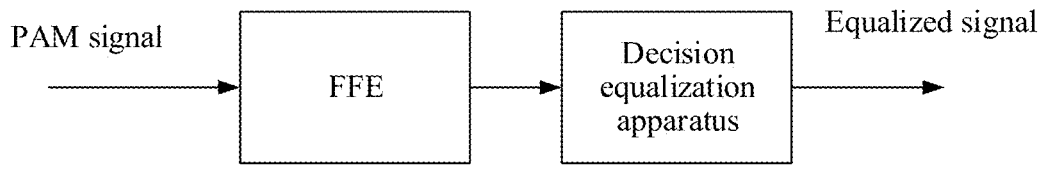
FIG. 11 is a schematic diagram of an architecture combining an FFE and a decision equalization apparatus according to an embodiment of this application.
Figure 12:
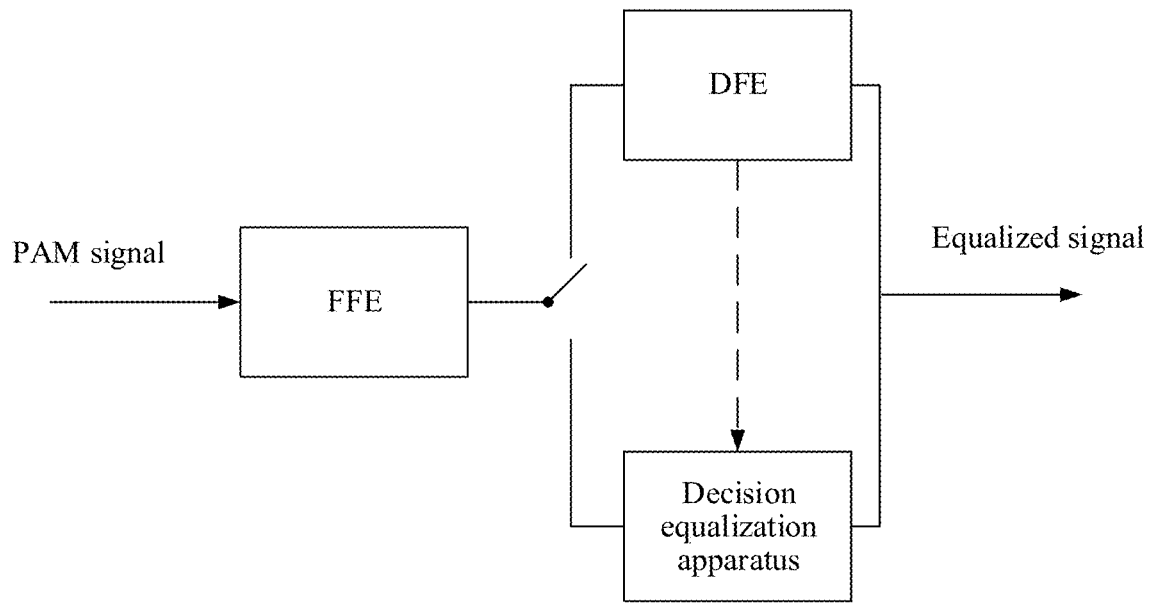
FIG. 12 is a schematic diagram of an architecture combining an FFE, a DFE, and a decision equalization apparatus according to an embodiment of this application.

In this embodiment, the decision equalization apparatus may be combined with the FFE to perform signal decision equalization, specifically, as shown in FIG. 11. In addition, the decision equalization apparatus, the FFE, and the DFE are combined to perform signal decision equalization, specifically, as shown in FIG. 12. In an architecture shown in FIG. 11, an initial expectation in the decision equalization apparatus may be an adaptive parameter output by the FFE. In an architecture shown in FIG. 12, an initial expectation in the decision equalization apparatus may be a convergence parameter output by the DFE. Optionally, an initial expectation in the decision equalization apparatus may alternatively be preset. This is not specifically limited herein.

604: The decision equalization apparatus determines a decision value of the input signal based on the first group of equalization expectations, the first group of decision thresholds, and the input signal.

The decision equalization apparatus performs decision equalization on the input signal based on the first group of equalization expectations and the first group of decision thresholds, and outputs the decision value of the input signal.

In this embodiment, it is assumed that the first group of equalization expectations are (+30, +10, −10, −30), the first group of decision thresholds are (+20, 0, −20), decision values are (+3, +1, −1, −3), and the input signal is 25. In this case, the decision value is +3, and an equalization expectation corresponding to the decision value is +30.

It may be understood that a relationship among the equalization expectations, the decision threshold, the decision circuit, and the decision value may be as follows:

An intermediate value of the equalization expectations is the decision threshold, and a decision value corresponding to the decision circuit may be in a correspondence with the equalization expectation. In the architecture shown in FIG. 7, the decision threshold is (+2, 0, −2), the equalization expectation is (+3, +1, −1, −3), the decision value is (+3, +1, −1, −3), and decision circuits may be set to a decision circuit corresponding to +3, a decision circuit corresponding to +1, a decision circuit corresponding to −1, and a decision circuit corresponding to −3. In addition, in the architecture shown in FIG. 7, if the decision threshold is (+20, 0, −20), the equalization expectation is (+30, +10, −10, −30), and the decision value is (+3, +1, −1, −3), decision circuits may also be set to a decision circuit corresponding to +3, a decision circuit corresponding to +1, a decision circuit corresponding to −1, and a decision circuit corresponding to −3. That is, when an equalized signal output through decision equalization is +30, the decision value is +3, and corresponds to a decision circuit corresponding to +3; when an equalized signal output through decision equalization is +10, the decision value is +1, and corresponds to a decision circuit corresponding to +1; when an equalized signal output through the decision equalization is −10, the decision value is −1, and corresponds to a decision circuit corresponding to −1; and when an equalized signal that is output by the decision equalization is −30, the decision value is −3, and corresponds to a decision circuit corresponding to −3.

605: The decision equalization apparatus outputs the decision value.

606: The decision equalization apparatus updates a first equalization expectation in the first group of equalization expectations to a second equalization expectation based on the decision value and the input signal to obtain a second group of equalization expectations, where the first equalization expectation is an equalization expectation corresponding to the decision value.

After the decision equalization apparatus obtains the decision value, the decision equalization apparatus may further update, as shown in FIG. 7, a first equalization expectation in the first group of equalization expectations of a decision circuit that outputs the decision value to obtain the second equalization expectation, to obtain the second group of equalization expectations, where the first equalization expectation is an equalization expectation corresponding to the decision value.

Specifically, an equalization expectation update process may include the following several possible implementations:

In a possible implementation, the decision equalization apparatus updates and iterates the equalization expectation corresponding to the decision circuit each time after performing decision equalization to obtain the decision value. In an example solution, the solution specifically includes: The decision equalization apparatus determines a decision error of the decision circuit based on the first equalization expectation and the input signal; and then updates the first equalization expectation to the second equalization expectation based on the decision error. In this way, a convergence process of the equalization expectation and the decision threshold can be quickly implemented, thereby implementing linear and non-linear equalization of a signal.

Optionally, in this embodiment, the decision error is equal to the first equalization expectation minus the input signal. In an example solution, a manner of calculating the decision error may be shown in Table 1.

TABLE 1

| | |
|---|---|
| $y_k \leq T_{i0}$ | $e_k = EV_{i0} - y_k$ |
| $T_{i0} < y_k \leq T_{i1}$ | $e_k = EV_{i1} - y_k$ |
| $T_{i1} < y_k \leq T_{i2}$ | $e_k = EV_{i2} - y_k$ |
| $y_k > T_{i2}$ | $e_k = EV_{i3} - y_k$ |

$y_k$ indicates the input signal, $e_k$ indicates the decision error, $T_{i0}$, $T_{i1}$ and $T_{i2}$ indicate decision thresholds on an $i^{th}$ decision circuit, and $EV_{i0}$, $EV_{i1}$, $EV_{i2}$, and $EV_{i3}$ indicate equalization expectations on the $i^{th}$ decision circuit. In an example solution, it is assumed that an input signal $y_k$ enters a first path (namely, a decision circuit corresponding to +3) in FIG. 8 at a current $k^{th}$ moment for decision. At this moment, values of a first group of decision thresholds $T_{30}$, $T_{31}$, and $T_{32}$ of a first channel are respectively −20, 0, and +20, and values of a first group of equalization expectations $EV_{30}$, $EV_{31}$, $EV_{32}$, and $EV_{33}$ are −30, −10, +10, and +30. If $y_k=25$, a decision value $d_k=+3$ is determined and output, and a decision error $e_k$ is $EV_{33}-y_k=5$; if $y_k=15$, a decision value $d_k=+1$ is determined and output, and a decision error $e_k$ is $EV_{32}-y_k=-5$; if $y_k=-15$ a decision value $d_k=-1$ is determined and output, and a decision error $e_k$ is $EV_{31}-y_k=+5$; and if $y_k=-25$ a decision value $d_k=-3$ is determined and output, and a decision error $e_k$ is $EV_{32}-y_k=-5$.

It may be understood that a decision relationship between the input signal and the decision threshold may be another relationship. This is not specifically limited herein.

Optionally, a method in which the determining equalization apparatus updates the first equalization expectation to the second equalization expectation based on the decision error specifically includes:

In a possible implementation, the decision equalization apparatus updates the first equalization expectation to the second equalization expectation based on the decision error and a first formula, where the first formula is:

$$EV_{new} = EV_{old} - \text{sign}(e_k),$$

where $EV_{new}$ indicates the second equalization expectation, $EV_{old}$ indicates the first equalization expectation, $e_k$ indicates the decision error, and k indicates a current moment.

In an example solution, if a decision value $d_{k-1}=+3$ at a moment k−1, an input signal $y_k$ enters the first path (namely, the decision circuit corresponding to +3) in FIG. 8 at the current $k^{th}$ moment for decision. It is assumed that, at this moment, values of a first group of decision thresholds $T_{30}$, $T_{31}$, and $T_{32}$ of a first channel are −20, 0, and +20, and values of a first group of equalization expectations $EV_{30}$, $EV_{31}$, $EV_{32}$, and $EV_{33}$ are −30, −10, +10, and +30. If $y_k$=25, a decision value $d_k$=+3 is determined and output, and a decision error $e_k$ is $EV_{33}-y_k$=5. In this example, $EV_{33,\ new}=EV_{33}-\text{sign}(e_k)=30-\text{sign}(5)=29$. Values of remaining EV remain unchanged.

In another possible implementation, the decision equalization apparatus updates the first equalization expectation to the second equalization expectation based on the decision error and a second formula, where the second formula is:

$$EV_{new}=EV_{old}-\mu*(e_k),$$

where $EV_{new}$ indicates the second equalization expectation, $EV_{old}$ indicates the first equalization expectation, $e_k$ indicates the decision error, $\mu$ indicates a preset constant, and k indicates a current moment.

In an example solution, if a decision value $d_{k-1}$=+3 at a moment k−1, an input signal $y_k$ enters the first path (namely, the decision circuit corresponding to +3) in FIG. 8 at the current $k^{th}$ moment for decision. It is assumed that, at this moment, values of a first group of decision thresholds $T_{30}$, $T_{31}$, and $T_{32}$ of a first channel are −20, 0, and +20, and values of a first group of equalization expectations $EV_{30}$ $EV_{31}$ $EV_{32}$, and $EV_{33}$ are −30, −10, +10, and +30. If $y_k$=25, a decision value $d_k$=+3 is determined and output, and a decision error $e_k$ is $Ev_{33}-y_k$=5 In this example, $EV_{33,\ new}=EV_{33}-\mu*e_k=30-0.1*5=29.5$ Values of remaining EV remain unchanged.

In another possible implementation, the determining equalization apparatus updates and iterates an equalization expectation after a preset quantity of times of determining equalization is performed on an equalization expectation on the determining circuit (that is, after a quantity of times of determining an equalization expectation on the determining circuit reaches a preset quantity of times, for example, after a decision value corresponding to a decision value $EV_{33}$ is output for four times, the equalization expectation $EV_{33}$ is updated to $EV_{33,\ new}$). In an example solution, the solution specifically includes:

The decision equalization apparatus obtains a decision error based on the input signal and the first equalization expectation. The decision equalization apparatus records the decision error to generate a decision error set, where the decision error set includes a decision error corresponding to the first equalization expectation. When a quantity of decision errors in the decision error set reaches a preset quantity, the decision equalization apparatus determines a final decision error based on the decision errors in the decision error set; and updates the first equalization expectation to the second equalization expectation based on the final decision error. In this way, a convergence process of the equalization expectation and the decision threshold can be quickly implemented, thereby implementing linear and non-linear equalization of a signal.

It may be understood that in this embodiment, when recording the decision error, the decision equalization apparatus may directly perform symbol calculation on the decision error, and then record values obtained through calculation as a decision error set. Finally, after a quantity of values corresponding to the decision error in the decision error set reaches a preset quantity, the final decision error is determined based on a value in the decision error set, and the first equalization expectation is updated to the second equalization expectation based on the final decision error. In an example solution, decision errors corresponding to the first equalization expectation are (−2, +4, +1, −5), and a decision error set obtained by performing symbol calculation on the decision error is recorded as (−1, +1, +1, −1). In this case, a final decision error is 0, and the first equalization expectation does not need to be updated in this update. If decision errors corresponding to the first equalization expectation are respectively (−2, +4, +1, +1), a decision error set obtained by performing symbol calculation on the decision errors is recorded as (−1, +1, +1, +1), a final decision error is 2, and the first equalization expectation is updated to the second equalization expectation based on the final decision error. In this way, operation complexity of the decision equalization apparatus in recording a decision error can be reduced.

Optionally, in this embodiment, the final decision error is equal to a sum of a plurality of decision errors.

Optionally, in this embodiment, that the decision equalization apparatus updates the first equalization expectation to the second equalization expectation based on the final decision error specifically includes:

In a possible implementation, the decision equalization apparatus updates the first equalization expectation to the second equalization expectation based on the final decision error and a first formula, where the first formula is:

$$EV_{new}=EV_{old}-\text{sign}(e_k),$$

where $EV_{new}$ indicates the second equalization expectation, $EV_{old}$ indicates the first equalization expectation, $e_k$ indicates the final decision error, and k indicates a current moment.

In another possible implementation, the decision equalization apparatus updates the first equalization expectation to the second equalization expectation based on the decision error and a second formula, where the second formula is:

$$EV_{new}=EV_{old}-\mu*(e_k).$$

where $EV_{new}$ indicates the second equalization expectation, $EV_{old}$ indicates the first equalization expectation, $e_k$ indicates the final decision error, $\mu$ indicates a preset constant, and k indicates a current moment.

For example, the system is configured to update each parameter after four decisions, that is, P=4. It is assumed that four decision errors of $EV_{33}$ in the decision circuit corresponding to +3 are respectively +2, −4, −1, and +1, and $e_k$=+2−4−1+1=−2. If the "sign extraction" algorithm is used, $EV_{33,\ new}=EV_{33}-\text{sign}(e_k)=30-\text{sign}(-2)=31$. If the "multiplication coefficient" algorithm is used, $EV_{33,\ new}=EV_{33}-\mu*e_k=30-0.1*(-2)=30.2$.

In another possible implementation, the decision equalization apparatus updates and iterates, after a preset time period, an equalization expectation corresponding to the decision circuit. In a possible implementation, the decision equalization apparatus collects statistics about a decision error corresponding to each equalization expectation on each decision circuit in a preset time period, and then the decision equalization apparatus updates each equalization expectation based on the decision error corresponding to each equalization expectation. Similarly, in this embodiment, when recording the decision error, the decision equalization apparatus may directly perform symbol calculation on the decision error, and then record values obtained through calculation as a decision error set. Finally, after a quantity of values corresponding to the decision error in the decision error set reaches a preset quantity, the final decision error is determined based on a value in the decision error set, and the first equalization expectation is updated to the second equalization expectation based on the final decision error. In an example solution, decision errors corresponding to the first equalization expectation are (−2, +4, +1, −5), and a decision error set obtained by performing symbol calculation on the decision error is recorded as (−1, +1, +1, −1). In this case, a final decision error is 0, and the first equalization expectation does not need to be updated in this update. If decision errors corresponding to the first equalization expectation are respectively (−2, +4, +1, +1), a decision error set obtained by performing symbol calculation on the decision errors is recorded as (−1, +1, +1, +1), a final decision error is 2, and the first equalization expectation is updated to the second equalization expectation based on the final decision error. In this way, operation complexity of the decision equalization apparatus in recording a decision error can be reduced.

It may be understood that a manner of updating the equalization expectation may be the same as the technical solutions described in the foregoing two solutions. Details are not described herein again. In this way, a convergence process of the equalization expectation and the decision threshold can be quickly implemented, thereby implementing linear and non-linear equalization of a signal. For example, the system updates each parameter at an interval of one hour. In this hour, four decision errors of $EV_{33}$ in the decision circuit corresponding to +3 are respectively +2, −4, −1, and +1, and $e_k=+2-4-1+1=-2$. If the "sign extraction" algorithm is used, $$EV_{33,new}=EV_{33}-\text{sign}(e_k)=30-\text{sign}(-2)=31.$$

If the "multiplication coefficient" algorithm is used, $$EV_{33,new}=EV_{33}-\mu^*e_k=30-0.1^*(-2)=30.2.$$

Four decision errors of $EV_{33}$ in the decision circuit corresponding to +1 are respectively +2, +4, −1, and +1, and $e_k=+2+4-1+1=6$. If the "sign extraction" algorithm is used, $$EV_{33,new}=EV_{33}-\text{sign}(e_k)=30-\text{sign}(6)=29.$$

If the "multiplication coefficient" algorithm is used, $$EV_{33,new}=EV_{33}-\mu^*e_k=30-0.1^*(6)=29.4.$$

607: The decision equalization apparatus updates at least one decision threshold in the first group of decision thresholds based on the second equalization expectation to obtain a second group of decision thresholds, where the second group of decision thresholds and the second group of equalization expectations are used for next decision equalization of the decision circuit.

After the decision equalization apparatus obtains the second equalization expectation through update, the decision equalization apparatus calculates and updates at least one decision threshold in the first group of decision thresholds based on the second equalization expectation and a third equalization expectation adjacent to the second equalization expectation to obtain the second group of decision thresholds.

In this embodiment, the third equalization expectation may be determined based on a location relationship of the second equalization expectation, or the third equalization expectation may be determined based on a location relationship of the second equalization expectation and a location relationship between the input signal and the second equalization expectation.

In an example solution, if the first group of decision thresholds are $T_{30}$, $T_{31}$ and $T_{32}$ $T_{32}$, and the first group of equalization expectations are $EV_{30}$, $EV_{31}$ $EV_{32}$ and $EV_{33}$ and $EV_{33}$ is updated, the third equalization expectation is only $EV_{32}$. If $EV_{32}$ is updated, the third equalization expectation may be $EV_{33}$ and/or $EV_{31}$.

For example, values of the first group of decision thresholds $T_{30}$, $T_{31}$ and $T_{32}$ are respectively −20, 0, and +20, and values of the first group of equalization expectations $EV_{30}$, $EV_{31}$, $EV_{32}$ and $EV_{33}$ are −30, −10, +10, and +30. If $EV_{33}$ is updated from +30 to 29, $T_{32}$ is updated to $T_{32,\,new}=(EV_{33}+EV_{32})/2=(29+10)/2=19.5$.

If values of the first group of decision thresholds $T_{30}$, $T_{31}$, and $T_{32}$ are respectively −20, 0, and +20, and values of the first group of equalization expectations $EV_{30}$, $EV_{31}$, $EV_{32}$ and $EV_{33}$ are −30, −10+10, and +30. If $EV_{32}$ is updated from +10 to 11, $T_{32}$ is updated to $T_{32,\,new}=(EV_{33}+EV_{32})/2=(30+11)/2=20.5$ and $T_{31}$ is updated to $T_{31,\,new}=(EV_{31}+EV_{32})/2=(-10+11)/2=0.5$.

If values of the first group of decision thresholds $T_{30}$, $T_{31}$ and $T_{32}$ are respectively −20, 0, and +20, and values of the first group of equalization expectations $EV_{30}$, $EV_{31}$, $EV_{32}$ and $EV_{33}$ are −30, −10, +10, and +30, and $EV_{32}$ is updated from +10 to 11, but the input signal is between $EV_{32}$ and $EV_{33}$, only $T_{32}$ is updated, an $T_{32}$ is updated to $T_{32,\,new}=(EV_{33}+EV_{32})/2=(30+11)/2=20.5$.

If values of the first group of decision thresholds $T_{30}$, $T_{31}$, and $T_{32}$ are respectively −20, 0, and +20, and values of the first group of equalization expectations $EV_{30}$, $EV_{31}$, $EV_{32}$ and $EV_{33}$ are −30−10, +10, and +30, $y_k=15$ and $EV_{32}$ is updated from +10 to 11, but the input signal is between $EV_{32}$ an d $EV_{33}$, only $T_{32}$ is updated, and $T_{32}$ is updated to $T_{32,\,new}=(EV_{33}+EV_{32})/2=(30+11)/2=20.5$.

If values of the first group of decision thresholds $T_{30}$, $T_{31}$ and $T_{32}$ are respectively −20, 0, and +20, and values of the first group of equalization expectations $EV_{30}$, $EV_{31}$ $EV_{32}$ and $EV_{33}$ are −30, −10, +10, and +30, $y_k=5$, and $EV_{32}$ is updated from +10 to 9, but the input signal is between $EV_{32}$ and $EV_{31}$, only $T_{31}$ is updated, and $T_{31}$ is updated to $T_{31,\,new}=(EV_{31}+EV_{32})/2=(-10+9)/2=-0.5$.

Figure 13:
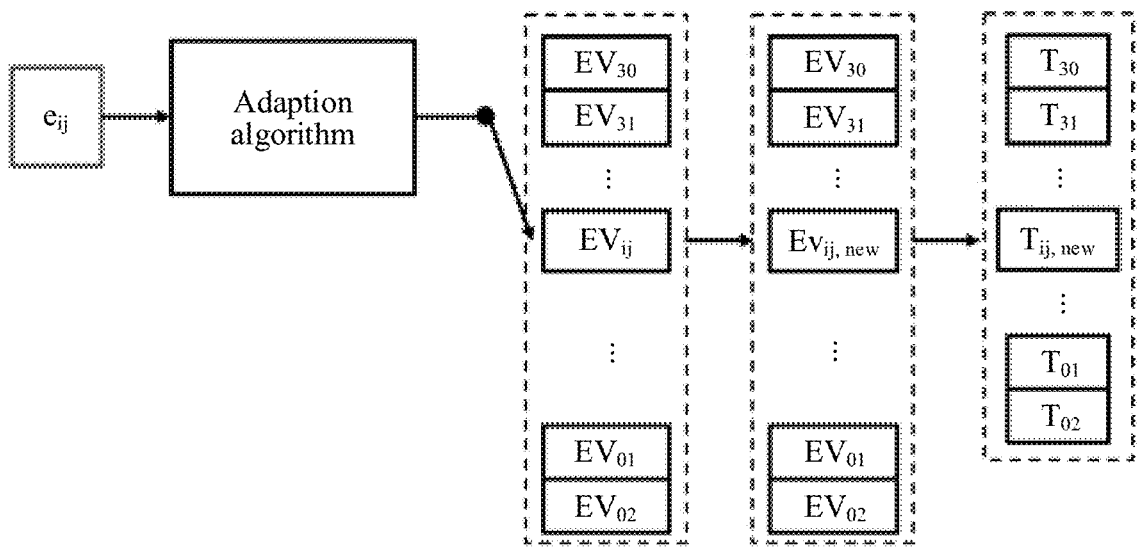
FIG. 13 is a schematic diagram of iteration and update of a decision threshold and an equalization expectation according to an embodiment of this application.

In an example solution, an iteration and update process of the equalization expectation and the decision threshold may be shown in FIG. 13. To be specific, for each error value, one equalization expectation in the decision equalization apparatus is updated, and one or two decision thresholds are updated for the equalization expectation.

Figure 14:
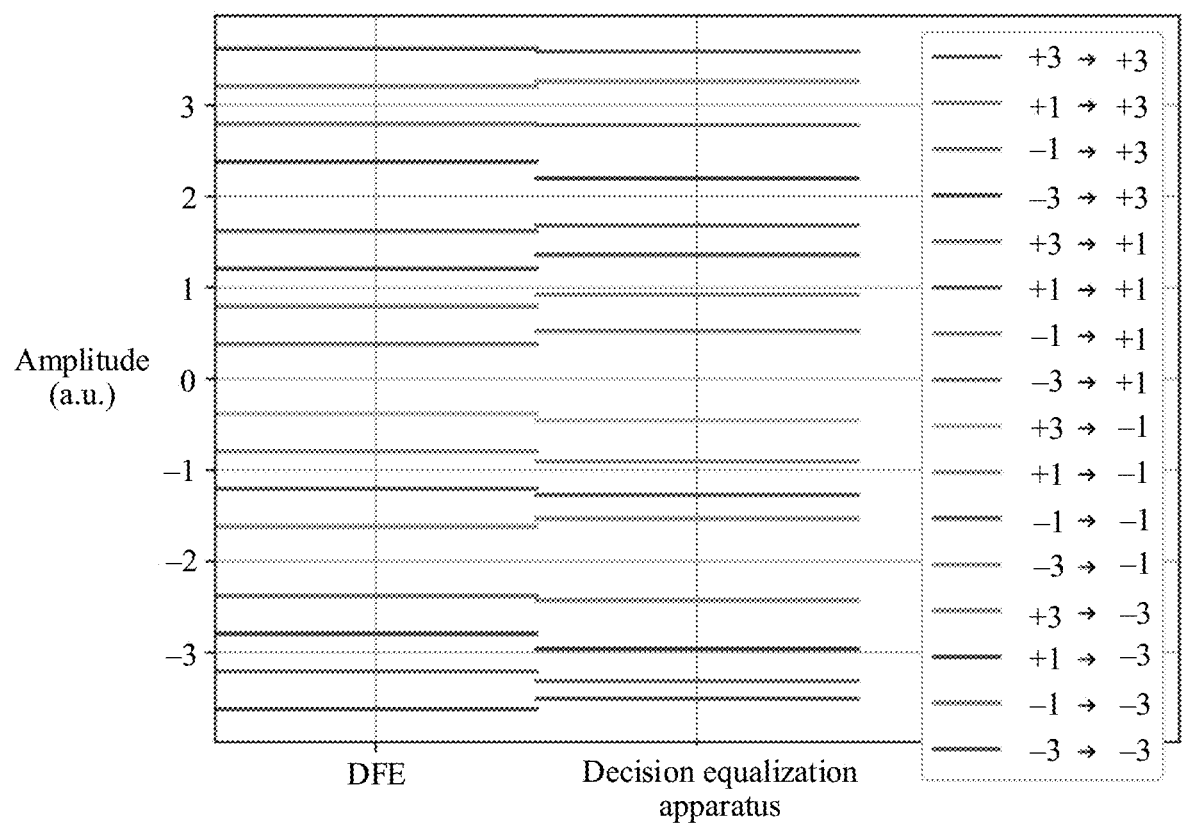
FIG. 14 to FIG. 17 are performance comparison diagrams of a nonlinear signal decision equalization method and decision equalization in a DFE architecture to which an embodiment of this application is applied.
Figure 15:
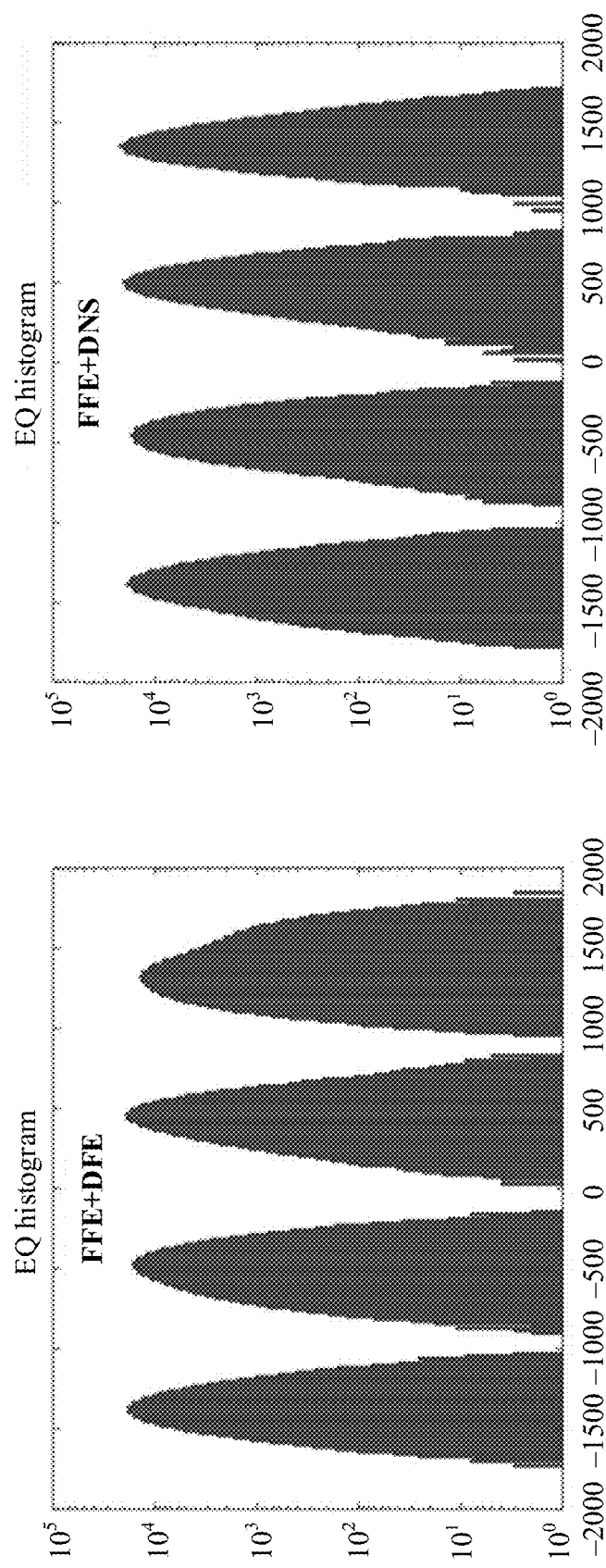
Figure 16:
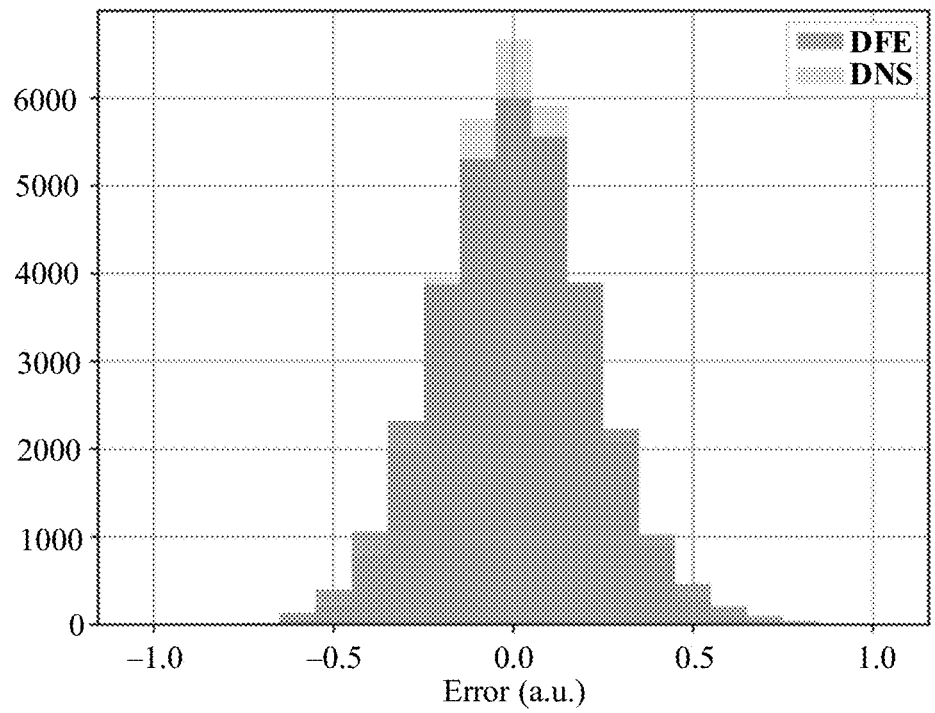
Figure 17:
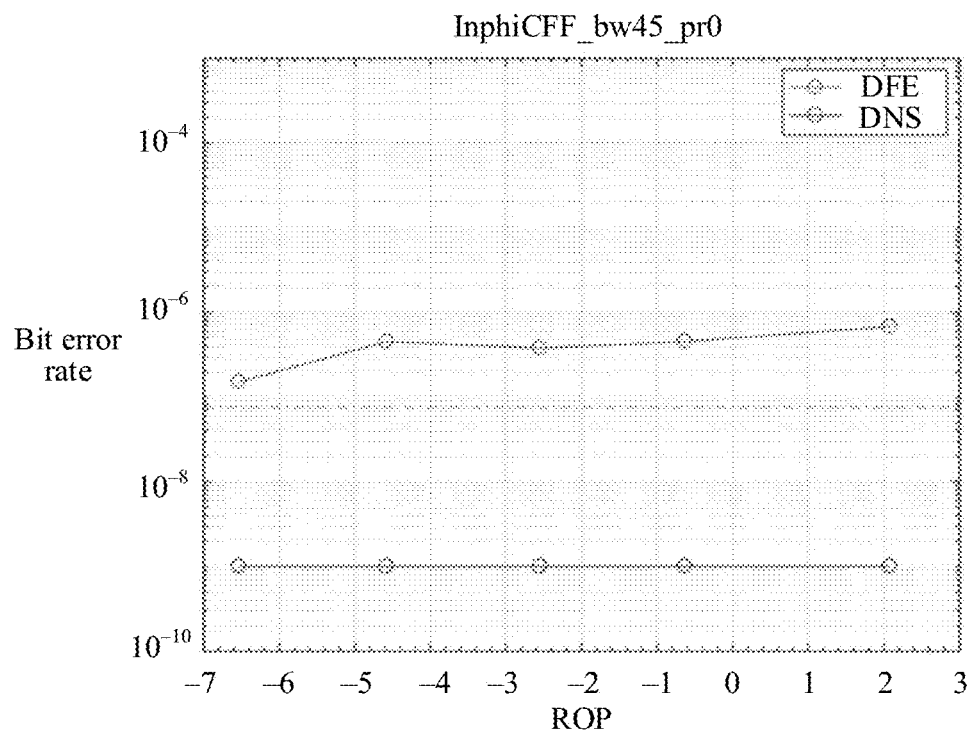

In this embodiment, signal decision equalization of an actual channel is used for description. As shown in FIG. 14, because a decider of a DFE architecture is related only to a current signal, a decision threshold and an equalization expectation generated by the DFE are evenly distributed at four levels without distinction based on a convergence parameter. However, the decision equalization apparatus provided in this embodiment considers conditions of a previous signal and the current signal in iterative calculation. For a nonlinear feature of a channel, the decision equalization apparatus provided in this embodiment converges different signal sequences into different decision thresholds and equalization expectations, to perform corresponding equalization on nonlinearity of the channel. However, because a non-uniform decision threshold (or an equalization expectation) generated by the decision equalization apparatus provided in this embodiment is closer to the non-linear feature of the channel, it may be found by comparing a one-tap decision equalization apparatus provided in this embodiment with a one-tap DFE equalizer as an example that equalization performance of the one-tap decision equalization apparatus provided in this embodiment is stronger than that of the one-tap DFE equalizer. A specific effect may be shown in FIG. 15 to FIG. 17. It may be understood that dynamic nonlinear decision (dynamic nonlinear slicing, DNS) in FIG. 14 to FIG. 17 is the decision equalization apparatus provided in this embodiment of this application.

In this embodiment, the decision equalization apparatus performs iteration and update on each decision threshold of a decision circuit based on an equalized signal that is output by the decision circuit, to implement independent iteration and update of each decision threshold, and implement optimal equalization and decision on a signal more effectively, thereby improving equalization performance and reducing a bit error rate after equalization.

Figure 18:
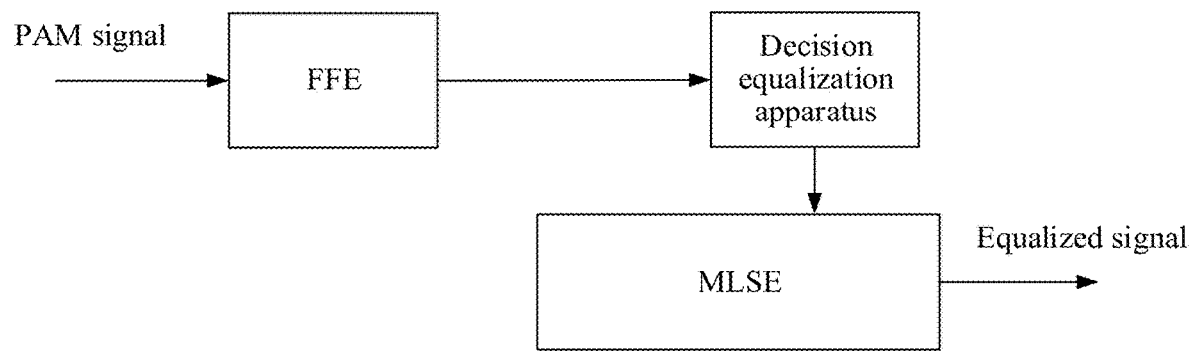
FIG. 18 is a schematic diagram of an architecture combining an FFE, a decision equalization apparatus, and MLSE.
Figure 19:
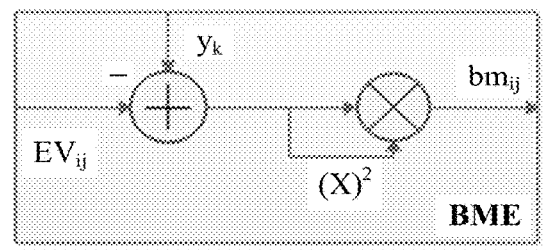
FIG. 19 is a diagram of an architecture of calculating a branch metric of MLSE when an FFE, a decision equalization apparatus, and MLSE are combined.

The foregoing describes a solution in which the decision equalization apparatus performs signal equalization. During actual application, the decision equalization apparatus may be further combined with another signal decision equalization architecture, to implement signal equalization. Specifically, as shown in FIG. 18, the decision equalization apparatus is combined with a maximum likelihood sequence estimation (MLSE) architecture, and performs signal decision equalization. In this architecture, the decision equalization apparatus provided in this embodiment of this application provides an equalization expectation as an input of the MLSE, and participates in calculation of a branch metric value, so that an MLSE algorithm is closer to a channel feature, and a non-linear equalization feature is effectively implemented. In this case, a calculation architecture of the branch metric value in an MLSE equalization process may be shown in FIG. 19, and the calculation may be expressed as follows:

$$bm_{ij} = [y_k - EV_{ij}]^2.$$

where $y_k$ indicates the input signal, $EV_{ij}$ indicates an equalization expectation output by the decision equalization apparatus, $bm_{ij}$ indicates a branch metric value, and k indicates a current moment.

Figure 20:
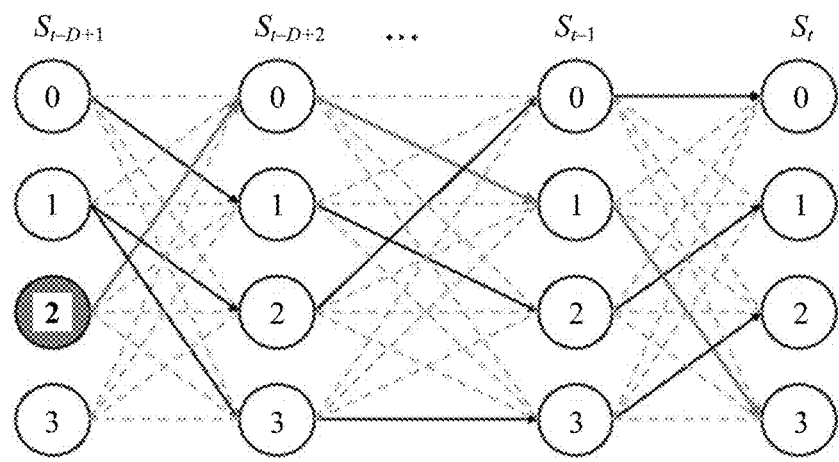
FIG. 20 is a diagram of a working principle of MLSE.

After completing calculation of a branch metric value of each state at each moment, the MLSE selects a survivor path (black solid line) of each state at the current moment according to a working principle shown in FIG. 20, calculates a survivor path of an entire sequence based on a backtracking length, and selects, according to a maximum likelihood criterion, a transmitting sequence (a gray solid line in FIG. 20) closest to a received signal, to obtain a state value at a t−D+1 moment.

Figure 21:
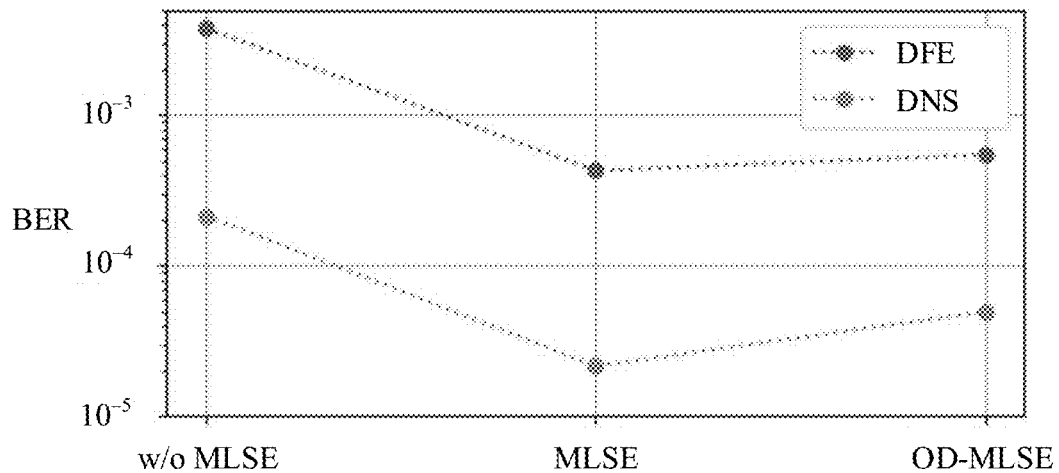
FIG. 21 is a diagram of equalization performance comparison between conventional MLSE and a combination architecture of a decision equalization apparatus and MLSE according to an embodiment of this application.

FIG. 21 is a diagram of comparison between equalization performance obtained after the determining equalization apparatus provided in this embodiment of this application is combined with the MLSE and equalization performance of the conventional MLSE. It can be learned that the determining equalization apparatus provided in this embodiment of this application can help the MLSE improve bit error rate performance by approximately one order of magnitude.

In this embodiment, a nonlinear signal determining equalization method is further provided. In this solution, the decision equalization apparatus obtains an input signal, where the input signal is a pulse amplitude modulation (PAM) signal or a pre-equalized signal that is output after pre-equalization is performed on the PAM signal. Then, the decision equalization apparatus determines a decision circuit of the input signal. In addition, the decision equalization apparatus further obtains a first group of decision thresholds and a first equalization expectation that correspond to the decision circuit. Then the decision equalization apparatus determines a decision value of the input signal based on the first group of equalization expectations, the first group of decision thresholds, and the input signal, and outputs the decision value. In addition, the decision equalization apparatus updates all first equalization expectations in the first group of equalization expectations based on the decision value and the input signal to obtain a second group of equalization expectations. Finally, the decision equalization apparatus updates all of the first group of decision thresholds based on the second equalization expectation to obtain a second group of decision thresholds, where the second group of decision thresholds and the second group of equalization expectations are used for next decision equalization of the decision circuit.

In this embodiment, a conventional technical solution may be used to update a decision threshold and an equalization expectation of one decision circuit, and details are not described herein again. In an example solution, a half-eye height (HEH) coefficient, namely, a scaling coefficient, of a decision value set is set to 10. If a decision value $d_{k-1}$+3 at a moment k−1, an input signal $y_k$ enters a first path (that is, the decision circuit corresponding to +3) in FIG. 8 at a current $k^{th}$ moment for decision. It is assumed that values of the first group of decision thresholds $T_{30}$, $T_{31}$, and $T_{32}$ of a first channel at the moment are −20, 0, and +20 (where −20 is equal to −2*scaling coefficient, 0 is equal to 0*scaling coefficient, and +20 is equal to +2*scaling coefficient), and values of the first group of equalization expectations $EV_{30}$, $EV_{31}$, $EV_{32}$, and $EV_{33}$ are −30, −10+10, and +30 (where −30 is equal to −3*scaling coefficient, −10 is equal to −1*scaling coefficient, +10 is equal to +1*scaling coefficient, and +30 is equal to +3*scaling coefficient). If $y_k$=25, a decision output is $d_k$=+3, and a decision error $e_k$ is $EV_{33}-y_k$=5. If the "sign extraction" algorithm is selected, a sign of an error is taken in a parameter update process. In this example, a scaling system is updated to $HEH_{new}=HEH_{old}-\text{sign}(e_k)$=10−sign(5)= 9 Therefore, decision thresholds of the first path of decision circuit are updated to −18, 0, and +18, and equalization expectations of the first path of decision circuit are updated to −27, −9, +9, and +27.

In addition, other operations in this solution are the same as those in the foregoing embodiment, and details are not described herein again.

In the technical solution provided in this embodiment, the decision equalization apparatus performs iteration and update on all decision thresholds of the decision circuit based on an equalized signal that is output by the decision circuit. That is, update and iteration of decision circuits are independent of each other, but a decision threshold in each decision circuit is iterated and updated associatively. In this way, independent iteration and update of each decision circuit is implemented, and optimal equalization and decision can be effectively implemented for a signal, thereby improving equalization performance and reducing a bit error rate after equalization.

The foregoing describes the signal decision equalization method in embodiments of this application. It may be understood that, to implement the foregoing functions, the decision equalization apparatus includes a corresponding hardware structure and/or software module for performing each function. A person of ordinary skill in the art should easily be aware that, in combination with the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the decision equalization apparatus may be divided into function modules based on the foregoing method examples. For example, each function module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 22:
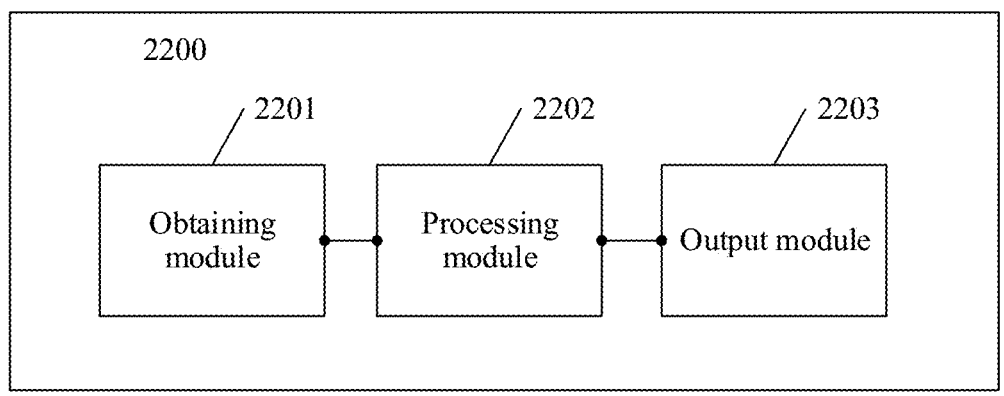
FIG. 22 is a schematic diagram of a structure of a decision equalization apparatus according to an embodiment of this application.

The following describes in detail a decision equalization apparatus in this application. FIG. 22 is a schematic diagram of an embodiment of a decision equalization apparatus according to an embodiment of this application. The decision equalization apparatus may be deployed in a router, a switch, or an OTN transmission device. The decision equalization apparatus 2200 includes:
an obtaining module 2201, configured to obtain an input signal, where the input signal is a pulse amplitude modulation (PAM) signal or a pre-equalized signal that is output after pre-equalization is performed on the PAM signal;
a processing module 2202, configured to determine a decision circuit of the input signal; where
the obtaining module 2201 is further configured to obtain a first group of decision thresholds and a first group of equalization expectations of the decision circuit; and
the processing module 2202 is further configured to determine a decision value of the input signal based on the first group of equalization expectations, the first group of decision thresholds, and the input signal; and
an output module 2203, configured to output the decision value, where
the processing module 2202 is further configured to: update a first equalization expectation in the first group of equalization expectations to a second equalization expectation based on the decision value and the input signal to obtain a second group of equalization expectations, where the first equalization expectation is an equalization expectation corresponding to the decision value; and update at least one decision threshold in the first group of decision thresholds based on the second equalization expectation to obtain a second group of decision thresholds, where the second group of decision thresholds and the second group of equalization expectations are used for next decision equalization of the decision circuit.

In a possible implementation, the processing module 2202 is specifically configured to: determine a decision error of the decision circuit based on the first equalization expectation and the input signal; and update the first equalization expectation to the second equalization expectation based on the decision error.

In a possible implementation, the decision error is equal to the first equalization expectation minus the input signal.

In a possible implementation, the processing module 2202 is specifically configured to:
update the first equalization expectation to the second equalization expectation based on the decision error and a first formula, where the first formula is:

$$EV_{new}=EV_{old}-\text{sign}(e_k),$$

where $EV_{new}$ indicates the second equalization expectation, $EV_{old}$ indicates the first equalization expectation, $e_k$ indicates the decision error, and k indicates a current moment; or
the processing module 2202 is specifically configured to update the first equalization expectation to the second equalization expectation based on the decision error and a second formula, where the second formula is:

$$EV_{new}=EV_{old}-\mu^*(e_k),$$

where $EV_{new}$ indicates the second equalization expectation, $EV_{old}$ indicates the first equalization expectation, $e_k$ indicates the decision error, μ indicates a preset constant, and k indicates a current moment.

In a possible implementation, the processing module 2202 is specifically configured to: obtain a decision error based on the input signal and the first equalization expectation; record the decision error to generate a decision error set, where the decision error set includes a decision error corresponding to the first equalization expectation; and when a quantity of decision errors in the decision error set reaches a preset quantity, determine a final decision error based on the decision errors in the decision error set; and update the first equalization expectation to the second equalization expectation based on the final decision error. In a possible implementation, the final decision error is equal to a sum of a plurality of decision errors.

In a possible implementation, the processing module 2202 is specifically configured to update the at least one decision threshold in the first group of decision thresholds based on the second equalization expectation and a third equalization expectation to obtain the second group of decision thresholds, where the third equalization expectation is an equalization expectation that is in the second group of equalization expectations and that is adjacent to the second equalization expectation.

In a possible implementation, the obtaining module 2201 is further configured to: receive an initial convergence parameter output in a decision feedback equalizer DFE mode, where the initial convergence parameter is used as an initial equalization expectation of the input signal during decision equalization.

In a possible implementation, the obtaining module 2201 is further configured to: receive an adaptive parameter output by a feed forward equalizer, where the adaptive parameter is used as an initial equalization expectation of the input signal during decision equalization.

In a possible implementation, the processing module 2202 is further configured to: determine a quantity of decision circuits and a quantity of decision thresholds based on a quantity N of levels of the PAM signal and a quantity M of equalized signals in a decision value set, where M is a positive integer.

In a possible implementation, the processing module 2202 is specifically configured to: determine the quantity of decision circuits and the quantity of decision thresholds based on the quantity N of levels of the PAM signal and the quantity M of equalized signals in the decision value set by using a third formula, where the third formula is:

$$S=N^M$$

$$P=N^{M}*(N-1),$$

where S indicates the quantity of decision circuits, P indicates the quantity of decision thresholds, N indicates the quantity of levels of the PAM signal, and M indicates the quantity of equalized signals in the decision value set.

In a possible implementation, the processing module 2202 is specifically configured to: determine the decision value of the input signal based on the first group of decision thresholds, the first group of equalization expectations, and the input signal through maximum likelihood sequence estimation.

Optionally, the processing module 2202 is specifically configured to determine the decision circuit of the input signal based on a decision value set, where the decision value set includes at least one decision value, and an occurrence moment of the at least one decision value is earlier than the occurrence moment of the input signal.

The decision equalization apparatus in the foregoing embodiment may be a network device or user equipment, or may be a chip applied to a network device, or another combined component, or the like that can implement a function of a network device. When the decision equalization apparatus is a network device, the transceiver module may be a transceiver, and the processing module may be a processor, for example, a chip. When the decision equalization apparatus is a chip system, a receiving part in the transceiver module may be an input port of the chip system, a sending part in the transceiver module may be an output interface of the chip system, and the processing module may be a processor of the chip system, for example, a central processing unit (CPU).

In this embodiment of this application, the memory included in the decision equalization apparatus is mainly configured to store a software program and data, for example, store the program described in the foregoing embodiment. The decision equalization apparatus further has the following functions:

a transceiver, configured to obtain an input signal, where the input signal is a pulse amplitude modulation (PAM) signal or a pre-equalized signal that is output after pre-equalization is performed on the PAM signal;

a processor, configured to determine a decision circuit of the input signal, where the transceiver is further configured to: obtain a first group of decision thresholds and a first group of equalization expectations of the decision circuit; and the processor is further configured to determine a decision value of the input signal based on the first group of equalization expectations, the first group of decision thresholds, and the input signal; and a transceiver, configured to output the decision value, where the processor is further configured to: update a first equalization expectation in the first group of equalization expectations to a second equalization expectation based on the decision value and the input signal to obtain a second group of equalization expectations, where the first equalization expectation is an equalization expectation corresponding to the decision value; and update at least one decision threshold in the first group of decision thresholds based on the second equalization expectation to obtain a second group of decision thresholds, where the second group of decision thresholds and the second group of equalization expectations are used for next decision equalization of the decision circuit.

In a possible implementation, the processor is specifically configured to: determine a decision error of the decision circuit based on the first equalization expectation and the input signal; and update the first equalization expectation to the second equalization expectation based on the decision error.

In a possible implementation, the decision error is equal to the first equalization expectation minus the input signal.

In a possible implementation, the processor is specifically configured to:

update the first equalization expectation to the second equalization expectation based on the decision error and a first formula, where the first formula is:

$EV_{new}=EV_{old}-\text{sign}(e_k)$, where $EV_{new}$ indicates the second equalization expectation, $EV_{old}$ indicates the first new old equalization expectation, $e_k$ indicates the decision error, and k indicates a current moment; k or the processor is specifically configured to update the first equalization expectation to the second equalization expectation based on the decision error and a second formula, where the second formula is:

$EV_{new}=EV_{old}-\mu*(e_k)$, where $EV_{new}$ indicates the second equalization expectation, $EV_{old}$ indicates the first equalization expectation, $e_k$ indicates the decision error, μ indicates a preset constant, and k indicates a current moment.

In a possible implementation, the processor is specifically configured to: obtain a decision error based on the input signal and the first equalization expectation; record the decision error to generate a decision error set, where the decision error set includes a decision error corresponding to the first equalization expectation; and when a quantity of decision errors in the decision error set reaches a preset quantity, determine a final decision error based on the decision errors in the decision error set; and update the first equalization expectation to the second equalization expectation based on the final decision error.

In a possible implementation, the final decision error is equal to a sum of a plurality of decision errors.

In a possible implementation, the processor is specifically configured to: update the at least one decision threshold in the first group of decision thresholds based on the second equalization expectation and a third equalization expectation to obtain the second group of decision thresholds, where the third equalization expectation is an equalization expectation that is in the second group of equalization expectations and that is adjacent to the second equalization expectation.

In a possible implementation, the transceiver is further configured to: receive an initial convergence parameter output in a decision feedback equalizer DFE mode, where the initial convergence parameter is used as an initial equalization expectation of the input signal during decision equalization.

In a possible implementation, the transceiver is further configured to: receive an adaptive parameter output by a feed forward equalizer, where the adaptive parameter is used as an initial equalization expectation of the input signal during decision equalization.

In a possible implementation, the processor is further configured to: determine a quantity of decision circuits and a quantity of decision thresholds based on a quantity N of levels of the PAM signal and a quantity M of equalized signals in a decision value set, where M is a positive integer.

In a possible implementation, the processor is specifically configured to: determine the quantity of decision circuits and the quantity of decision thresholds based on the quantity N of levels of the PAM signal and the quantity M of equalized signals in the decision value set by using a third formula, where the third formula is:

$S=N^M$ $P=N^{M}*(N-1)$, where S indicates the quantity of decision circuits, P indicates the quantity of decision thresholds, N indicates the quantity of levels of the PAM signal, and M indicates the quantity of equalized signals in the decision value set.

In a possible implementation, the processor is specifically configured to: determine the decision circuit of the input signal based on a decision value set, where the decision value set includes at least one decision value, and an occurrence moment of the at least one decision value is earlier than the occurrence moment of the input signal.

In a possible implementation, the processor is specifically configured to: determine the decision value of the input signal based on the first group of decision thresholds, the first group of equalization expectations, and the input signal through maximum likelihood sequence estimation.

In a possible implementation, the processor is specifically configured to determine the decision circuit of the input signal based on a decision value set, where the decision value set includes at least one decision value, and an occurrence moment of the at least one decision value is earlier than the occurrence moment of the input signal.

An embodiment of this application further provides a processing apparatus. The processing apparatus includes a processor and an interface. The processor is configured to perform the signal decision equalization method in any one of the foregoing method embodiments.

It should be understood that the processing apparatus may be a chip. The processor may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in a memory. The memory may be integrated into the processor, or may be located outside the processor and exist independently.

Herein, "implemented by hardware" means that a function of the foregoing module or unit is implemented through a hardware processing circuit that does not have a function of processing program instructions. The hardware processing circuit may include a discrete hardware component, or may be an integrated circuit. To reduce power consumption and a size, an integrated circuit is usually used for implementation. The hardware processing circuit may include an application-specific integrated circuit (ASIC) or a programmable logic device (PLD). The PLD may further include a field programmable gate array (FPGA), a complex programmable logic device (CPLD), and the like. These hardware processing circuits may be an independently packaged semiconductor chip (for example, packaged into an ASIC), or may be integrated with another circuit (such as a CPU or a DSP) and then packaged into a semiconductor chip. For example, a plurality of hardware circuits and CPUs may be formed on one silicon base, and are independently packaged into a chip, where the chip is also referred to as a SoC; or a circuit that is configured to implement an FPGA function and a CPU may be formed on a silicon base, and are independently packaged into a chip, where the chip is also referred to as a SoPC (system-on-a-programmable-chip).

Figure 23:
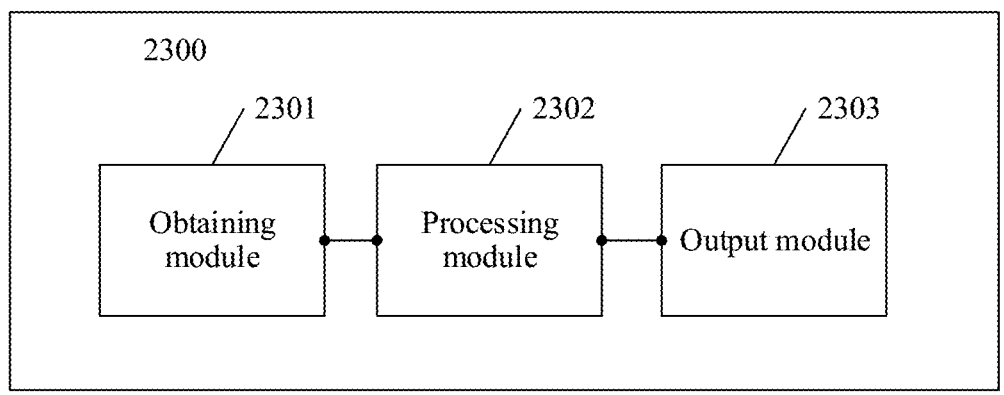
FIG. 23 is a schematic diagram of another structure of a decision equalization apparatus according to an embodiment of this application.

FIG. 23 is a schematic diagram of an embodiment of a decision equalization apparatus according to an embodiment of this application. The decision equalization apparatus may be deployed in a router, a switch, or an OTN transmission device. The decision equalization apparatus 2300 includes:
   an obtaining module 2301, configured to obtain an input signal, where the input signal is a pulse amplitude modulation PAM signal or a pre-equalized signal that is output after pre-equalization is performed on the PAM signal; and
   a processing module 2302, configured to determine a decision circuit of the input signal;

where the obtaining module 2301 is further configured to obtain a first group of decision thresholds and a first group of equalization expectations of the decision circuit; and distribution of the first group of decision thresholds is asymmetric distribution, and distribution of the first group of equalization expectations is asymmetric distribution; and
   where the processing module 2302 is further configured to determine a decision value of the input signal based on the first group of equalization expectations, the first group of decision thresholds, and the input signal.

The decision equalization apparatus 2300 further includes an output module 2303, configured to output the decision value.

In a possible implementation, a quantity of decision thresholds in the first group of decision thresholds is equal to a quantity of levels of the PAM signal minus 1; and a quantity of equalization expectations in the first group of equalization expectations is equal to the quantity of levels of the PAM signal.

In a possible implementation, the first group of equalization expectations is obtained by updating an equalization expectation at a previous moment based on an input signal at the previous moment and a decision value that is determined and output by using the input signal at the previous moment, the previous moment is earlier than an occurrence moment of the input signal, and the first group of decision thresholds is obtained by updating the first group of equalization expectations; or the first group of equalization expectations is obtained by updating equalization expectations at previous N moments based on input signals at the previous N moments and decision values that are determined and output by the input signals at the previous N moments, the previous N moments are earlier than an occurrence moment of the input signal, and the first group of decision thresholds is obtained by updating the first group of equalization expectations.

In a possible implementation, the decision circuit is included in a decision circuit set, decision thresholds of all channels of decision circuits in the decision circuit set are different, and equalization expectations of all channels of decision circuits in the decision circuit set are different.

In a possible implementation, the processing module 2302 is specifically configured to determine the decision circuit of the input signal based on a decision value set, where the decision value set includes at least one decision value, and an occurrence moment of the at least one decision value is earlier than the occurrence moment of the input signal.

The decision equalization apparatus in the foregoing embodiment may be a network device or user equipment, or may be a chip applied to a network device, or another combined component, or the like that can implement a function of a network device. When the decision equalization apparatus is a network device, the transceiver module may be a transceiver, and the processing module may be a processor, for example, a chip. When the decision equalization apparatus is a chip system, a receiving part in the transceiver module may be an input port of the chip system, a sending part in the transceiver module may be an output interface of the chip system, and the processing module may be a processor of the chip system, for example, a central processing unit (CPU).

In this embodiment of this application, the memory included in the decision equalization apparatus is mainly configured to store a software program and data, for example, store the program described in the foregoing embodiment. The decision equalization apparatus further has the following functions:

a transceiver, configured to obtain an input signal, where the input signal is a pulse amplitude modulation PAM signal or a pre-equalized signal that is output after pre-equalization is performed on the PAM signal;

a processor, configured to determine a decision circuit of the input signal, where the transceiver is further configured to: obtain a first group of decision thresholds and a first group of equalization expectations of the decision circuit; and distribution of the first group of decision thresholds is asymmetric distribution, and distribution of the first group of equalization expectations is asymmetric distribution; and the processor is further configured to determine a decision value of the input signal based on the first group of equalization expectations, the first group of decision thresholds, and the input signal.

In a possible implementation, a quantity of decision thresholds in the first group of decision thresholds is equal to a quantity of levels of the PAM signal minus 1; and a quantity of equalization expectations in the first group of equalization expectations is equal to the quantity of levels of the PAM signal.

In a possible implementation, the first group of equalization expectations is obtained by updating an equalization expectation at a previous moment based on an input signal at the previous moment and a decision value that is determined and output by using the input signal at the previous moment, the previous moment is earlier than an occurrence moment of the input signal, and the first group of decision thresholds is obtained by updating the first group of equalization expectations; or the first group of equalization expectations is obtained by updating equalization expectations at previous N moments based on input signals at the previous N moments and decision values that are determined and output by the input signals at the previous N moments, the previous N moments are earlier than an occurrence moment of the input signal, and the first group of decision thresholds is obtained by updating the first group of equalization expectations.

In a possible implementation, the decision circuit is included in a decision circuit set, decision thresholds of all channels of decision circuits in the decision circuit set are different, and equalization expectations of all channels of decision circuits in the decision circuit set are different.

In a possible implementation, the processor is specifically configured to determine the decision circuit of the input signal based on a decision value set, where the decision value set includes at least one decision value, and an occurrence moment of the at least one decision value is earlier than the occurrence moment of the input signal.

An embodiment of this application further provides a processing apparatus. The processing apparatus includes a processor and an interface. The processor is configured to perform the signal decision equalization method in any one of the foregoing method embodiments.

It should be understood that the processing apparatus may be a chip. The processor may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in a memory. The memory may be integrated into the processor, or may be located outside the processor and exist independently.

Herein, "implemented by hardware" means that a function of the foregoing module or unit is implemented through a hardware processing circuit that does not have a function of processing program instructions. The hardware processing circuit may include a discrete hardware component, or may be an integrated circuit. To reduce power consumption and a size, an integrated circuit is usually used for implementation. The hardware processing circuit may include an application-specific integrated circuit (ASIC) or a programmable logic device (PLD). The PLD may further include a field programmable gate array (FPGA), a complex programmable logic device (CPLD), and the like. These hardware processing circuits may be an independently packaged semiconductor chip (for example, packaged into an ASIC), or may be integrated with another circuit (such as a CPU or a DSP) and then packaged into a semiconductor chip. For example, a plurality of hardware circuits and CPUs may be formed on one silicon base, and are independently packaged into a chip, where the chip is also referred to as a SoC; or a circuit that is configured to implement an FPGA function and a CPU may be formed on a silicon base, and are independently packaged into a chip, where the chip is also referred to as a SoPC (system-on-a-programmable-chip).

An embodiment of this application further provides a computer-readable storage medium, including instructions. When the instructions are run on a computer, the computer controls a decision equalization apparatus to perform any one of the implementations shown in the foregoing method embodiments.

An embodiment of this application further provides a computer program product. The computer program product includes computer program code. When the computer program code is run on a computer, the computer performs any implementation shown in the foregoing method embodiments.

An embodiment of this application further provides a chip system, including a memory and a processor. The memory is configured to store a computer program, and the processor is configured to invoke the computer program from the memory and run the computer program, so that a chip performs any implementation shown in the foregoing method embodiments.

An embodiment of this application further provides a chip system, including a processor. The processor is configured to invoke and run a computer program, so that a chip performs any implementation shown in the foregoing method embodiments.

In addition, it should be noted that the described apparatus embodiment is merely an example. The units described as separate parts may or may not be physically separate, and parts displayed as units may or may not be physical units, in other words, may be located in one position, or may be distributed on a plurality of network units. Some or all of the modules may be selected based on actual requirements to achieve the objectives of the solutions of embodiments. In addition, in the accompanying drawings of the apparatus embodiments provided by this application, connection relationships between modules indicate that the modules have communication connections with each other, which may be specifically implemented as one or more communication buses or signal cables.

Based on the description of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be in various forms, for example, in a form of an analog circuit, a digital circuit, or a dedicated circuit. However, as for this application, software program implementation is a better implementation in most cases. Based on such an understanding, the technical solutions of this application essentially or the part contributing to the conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device to perform the methods in embodiments of this application.

All or some of the foregoing embodiments may be implemented by using software, hardware, firmware, or any combination thereof. When software is used to implement the embodiments, all or a part of the embodiments may be implemented in a form of a computer program product.

The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, computer instructions may be transmitted from a website, a computer, a first network device or a second network device, a computing device or a data center to another website, computer, first network device or second network device, or data center in a wired (for example, a coaxial cable, an optical fiber, or a digital subscriber line (DSL)) or wireless (for example, infrared, radio, or microwave) manner. The computer-readable storage medium may be any usable medium that can be stored by a computer, or a data storage device, such as a first network device, a second network device, or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

It should be understood that "one embodiment" or "an embodiment" mentioned in the entire specification means that particular features, structures, or characteristics related to the embodiment are included in at least one embodiment of this application. Therefore, "in one embodiment" or "in an embodiment" appearing throughout the specification does not necessarily refer to a same embodiment. In addition, these particular features, structures, or characteristics may be combined in one or more embodiments by using any appropriate manner. It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

In addition, the terms "system" and "network" may be used interchangeably in this specification. It should be understood that in embodiments of this application, "B corresponding to A" indicates that B is associated with A, and B may be determined according to A. However, it should be further understood that determining B based on A does not mean that B is determined based only on A. B may alternatively be determined based on A and/or other information.

A person of ordinary skill in the art may be aware that, in combination with the examples described in embodiments disclosed in this specification, units and algorithm steps can be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or a part contributing to a conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods in embodiments of this application.

In conclusion, the foregoing descriptions are merely examples of embodiments of the technical solutions of this application, but are not intended to limit the protection scope of this application. Any modification, equivalent replacement, or improvement made without departing from the spirit and principle of this application shall fall within the protection scope of this application.

What is claimed is:

1. A signal decision equalization method, comprising:
   obtaining an input signal, wherein the input signal is a pulse amplitude modulation (PAM) signal or a pre-equalized signal that is output after pre-equalization is performed on the PAM signal;
   determining a decision equalization of a decision circuit of the input signal;
   obtaining a first group of decision thresholds and a first group of equalization expectations of the decision circuit;
   determining a decision value of the input signal based on the first group of equalization expectations, the first group of decision thresholds, and the input signal;
   outputting the decision value;
   updating a first equalization expectation in the first group of equalization expectations to a second equalization expectation based on the decision value and the input signal to obtain a second group of equalization expectations, wherein the first equalization expectation is an equalization expectation corresponding to the decision value; and
   updating at least one decision threshold in the first group of decision thresholds based on the second equalization expectation to obtain a second group of decision thresholds, wherein the second group of decision thresholds and the second group of equalization expectations are used for next decision equalization of the decision circuit.

2. The method according to claim 1, wherein the updating the first equalization expectation in the first group of equalization expectations to the second equalization expectation comprises:
   determining a decision error of the decision circuit based on the first equalization expectation and the input signal; and
   updating the first equalization expectation to the second equalization expectation based on the decision error.

3. The method according to claim 2, wherein the decision error is equal to the first equalization expectation minus the input signal.

4. The method according to claim 2, wherein the updating the first equalization expectation to the second equalization expectation based on the decision error comprises:
   updating the first equalization expectation to the second equalization expectation based on the decision error and a first formula, wherein the first formula is:

$EV_{new}=EV_{old}-\text{sign}(e_k)$, wherein $EV_{new}$ indicates the second equalization expectation, $EV_{old}$ indicates the first equalization expectation, $e_k$ indicates the decision error, and k indicates a current moment; or
   updating the first equalization expectation to the second equalization expectation based on the decision error and a second formula, wherein the second formula is:

$EV_{new}=EV_{old}-\mu*(e_k)$, wherein $EV_{new}$ indicates the second equalization expectation, $EV_{old}$ indicates the first equalization expectation, $e_k$ indicates the decision error, $\mu$ indicates a preset constant, and k indicates a current moment.

5. The method according to claim 1, wherein the updating the first equalization expectation in the first group of equalization expectations to the second equalization expectation comprises:
   obtaining a decision error based on the input signal and the first equalization expectation;
   recording the decision error to generate a decision error set, wherein the decision error set comprises a decision error corresponding to the first equalization expectation; and
   based on a quantity of decision errors in the decision error set reaching a preset quantity:
      determining a final decision error based on the decision errors in the decision error set; and
      updating the first equalization expectation to the second equalization expectation based on the final decision error.

6. The method according to claim 5, wherein the final decision error is equal to a sum of a plurality of decision errors.

7. The method according to claim 1, wherein the updating at least one decision threshold in the first group of decision thresholds comprises:
   updating the at least one decision threshold in the first group of decision thresholds based on the second equalization expectation and a third equalization expectation to obtain the second group of decision thresholds, wherein the third equalization expectation is an equalization expectation that is in the second group of equalization expectations and that is adjacent to the second equalization expectation.

8. The method according to claim 1, wherein the method further comprises:
   receiving an initial convergence parameter output by a decision feedback equalizer (DFE) circuit, wherein the initial convergence parameter is used as an initial equalization expectation of the input signal during decision equalization.

9. The method according to claim 1, wherein the method further comprises:
   receiving an adaptive parameter output by a feed forward equalizer circuit, wherein the adaptive parameter is used as an initial equalization expectation of the input signal during decision equalization.

10. The method according to claim 1, wherein the method further comprises:
    determining a quantity of decision circuits and a quantity of decision thresholds based on a quantity N of levels of the PAM signal and a quantity M of equalized signals in a decision value set, wherein N is a positive integer and M is a positive integer.

11. The method according to claim 10, wherein the determining the quantity of decision circuits and the quantity of decision thresholds comprises:
    determining the quantity of decision circuits and the quantity of decision thresholds based on the quantity N of levels of the PAM signal and the quantity M of equalized signals in the decision value set by using a third formula, wherein the third formula is:

$S=N^M$ $P=N^M*(N-1)$' wherein S indicates the quantity of decision circuits, P indicates the quantity of decision thresholds, N indicates the quantity of levels of the PAM signal, and M indicates the quantity of equalized signals in the decision value set.

12. The method according to claim 1, wherein the determining the decision value of the input signal comprises:
determining the decision value of the input signal based on the first group of decision thresholds, the first group of equalization expectations, and the input signal through maximum likelihood sequence estimation.

13. The method according to claim 1, wherein the determining the decision circuit of the input signal comprises:
determining the decision equalization of the decision circuit of the input signal based on a decision value set, wherein the decision value set comprises at least one decision value, and an occurrence moment of the at least one decision value is earlier than an occurrence moment of the input signal.

14. A decision equalization apparatus, comprising:
a non-transitory memory storing instructions; and
a processor coupled to the non-transitory memory, wherein the instructions, when executed by the processor, cause the decision equalization apparatus to be configured to:
obtain an input signal, wherein the input signal is a pulse amplitude modulation (PAM) signal or a pre-equalized signal that is output after preprocessing is performed on the PAM signal;
determine a decision equalization of a decision circuit of the input signal;
obtain a first group of decision thresholds and a first group of equalization expectations of the decision circuit;
determine a decision value of the input signal based on the first group of equalization expectations, the first group of decision thresholds, and the input signal;
output the decision value;
update a first equalization expectation in the first group of equalization expectations to a second equalization expectation based on the decision value and the input signal to obtain a second group of equalization expectations, wherein the first equalization expectation is an equalization expectation corresponding to the decision value; and
update at least one decision threshold in the first group of decision thresholds based on the second equalization expectation to obtain a second group of decision thresholds, wherein the second group of decision thresholds and the second group of equalization expectations are used for next decision equalization of the decision circuit.

15. The decision equalization apparatus according to claim 14, wherein the instructions, when executed by the processor, further cause the decision equalization apparatus to be configured to:
determine a decision error of the decision circuit based on the first equalization expectation and the input signal; and
update the first equalization expectation to the second equalization expectation based on the decision error.

16. The decision equalization apparatus according to claim 15, wherein the decision error is equal to the first equalization expectation minus the input signal.

17. The decision equalization apparatus according to claim 15, wherein the instructions, when executed by the processor, further cause the decision equalization apparatus to be configured to:
update the first equalization expectation to the second equalization expectation based on the decision error and a first formula, wherein the first formula is:

$$EV_{new}=EV_{old}-\text{sign}(e_k),$$

wherein $EV_{new}$ indicates the second equalization expectation, $EV_{old}$ indicates the first equalization expectation, $e_k$ indicates the decision error, and k indicates a current moment; or
update the first equalization expectation to the second equalization expectation based on the decision error and a second formula, wherein the second formula is:

$$EV_{new}=EV_{old}-\mu*(e_k),$$

wherein $EV_{new}$ indicates the second equalization expectation, $EV_{old}$ indicates the first equalization expectation, $e_k$ indicates the decision error, $\mu$ indicates a preset constant, and k indicates a current moment.

18. The decision equalization apparatus according to claim 14, wherein the instructions, when executed by the processor, further cause the decision equalization apparatus to be configured to:
obtain a decision error based on the input signal and the first equalization expectation;
record the decision error to generate a decision error set, wherein the decision error set comprises a decision error corresponding to the first equalization expectation; and
based on a quantity of decision errors in the decision error set reaching a preset quantity:
determine a final decision error based on the decision errors in the decision error set; and
update the first equalization expectation to the second equalization expectation based on the final decision error.

19. The decision equalization apparatus according to claim 18, wherein the final decision error is equal to a sum of a plurality of decision errors.

20. The decision equalization apparatus according to claim 14, wherein the instructions, when executed by the processor, further cause the decision equalization apparatus to be configured to:
update the at least one decision threshold in the first group of decision thresholds based on the second equalization expectation and a third equalization expectation to obtain the second group of decision thresholds, wherein the third equalization expectation is an equalization expectation that is in the second group of equalization expectations and that is adjacent to the second equalization expectation.

21. A signal decision equalization method, comprising:
obtaining an input signal, wherein the input signal is a pulse amplitude modulation (PAM) signal or a pre-equalized signal that is output after pre-equalization is performed on the PAM signal;
determining a decision equalization of a decision circuit of the input signal;
obtaining a first group of decision thresholds and a first group of equalization expectations of the decision circuit, wherein distribution of the first group of decision thresholds is asymmetric distribution, and distribution of the first group of equalization expectations is asymmetric distribution; and determining a decision value of the input signal based on the first group of equalization expectations, the first group of decision thresholds, and the input signal.

22. The method according to claim 21, wherein:
a quantity of decision thresholds in the first group of decision thresholds is equal to a quantity of levels of the PAM signal minus 1; and
a quantity of equalization expectations in the first group of equalization expectations is equal to the quantity of levels of the PAM signal.

23. The method according to claim 21,
wherein the first group of equalization expectations is obtained by updating an equalization expectation at a previous moment based on an input signal at the previous moment and a decision value that is determined and output by using the input signal at the previous moment, wherein the previous moment is earlier than an occurrence moment of the input signal, and the first group of decision thresholds is obtained by updating the first group of equalization expectations; or
wherein the first group of equalization expectations is obtained by updating equalization expectations at previous N moments based on input signals at the previous N moments and decision values that are determined and output by the input signals at the previous N moments, wherein the previous N moments are earlier than an occurrence moment of the input signal, and the first group of decision thresholds is obtained by updating the first group of equalization expectations, wherein N is a positive integer.

24. The method according to claim 21, wherein the decision circuit is comprised in a decision circuit set, wherein decision thresholds of channels of each decision circuit in the decision circuit set are different, and wherein equalization expectations of the channels of each decision circuit in the decision circuit set are different.

25. The method according to claim 21, wherein the determining the decision circuit of the input signal comprises:
determining the decision equalization of the decision circuit of the input signal based on a decision value set, wherein the decision value set comprises at least one decision value, and an occurrence moment of the at least one decision value is earlier than an occurrence moment of the input signal.

26. A decision equalization apparatus, comprising:
a non-transitory memory storing instructions; and
a processor coupled to the non-transitory memory, wherein the instructions, when executed by the processor, cause the decision equalization apparatus to be configured to:
obtain an input signal, wherein the input signal is a pulse amplitude modulation (PAM) signal or a pre-equalized signal that is output after pre-equalization is performed on the PAM signal;
determine a decision equalization of a decision circuit of the input signal;
obtain a first group of decision thresholds and a first group of equalization expectations of the decision circuit, wherein distribution of the first group of decision thresholds is asymmetric distribution, and distribution of the first group of equalization expectations is asymmetric distribution; and
determine a decision value of the input signal based on the first group of equalization expectations, the first group of decision thresholds, and the input signal.

27. The decision equalization apparatus according to claim 26, wherein:
a quantity of decision thresholds in the first group of decision thresholds is equal to a quantity of levels of the PAM signal minus 1; and
a quantity of equalization expectations in the first group of equalization expectations is equal to the quantity of levels of the PAM signal.

28. The decision equalization apparatus according to claim 26,
wherein the first group of equalization expectations is obtained by updating an equalization expectation at a previous moment based on an input signal at the previous moment and a decision value that is determined and output by using the input signal at the previous moment, wherein the previous moment is earlier than an occurrence moment of the input signal, and the first group of decision thresholds is obtained by updating the first group of equalization expectations; or
wherein the first group of equalization expectations is obtained by updating equalization expectations at previous N moments based on input signals at the previous N moments and decision values that are determined and output by the input signals at the previous N moments, wherein the previous N moments are earlier than an occurrence moment of the input signal, and the first group of decision thresholds is obtained by updating the first group of equalization expectations, wherein N is a positive integer.

29. The decision equalization apparatus according to claim 26, wherein the decision circuit is comprised in a decision circuit set, decision thresholds of all channels of decision circuits in the decision circuit set are different, and equalization expectations of all channels of decision circuits in the decision circuit set are different.

30. The decision equalization apparatus according to claim 26, wherein the instructions, when executed by the processor, further cause the decision equalization apparatus to be configured to determine the decision circuit of the input signal based on a decision value set, wherein the decision value set comprises at least one decision value, and an occurrence moment of the at least one decision value is earlier than an occurrence moment of the input signal.

* * * * *